US012363268B2

United States Patent
Duan et al.

(10) Patent No.: US 12,363,268 B2
(45) Date of Patent: Jul. 15, 2025

(54) VIDEO PROCESSING METHOD, VIDEO PROCESSING DEVICE, AND DISPLAY DEVICE

(71) Applicant: BOE TECHNOLOGY GROUP CO., LTD., Beijing (CN)

(72) Inventors: Ran Duan, Beijing (CN); Lihua Geng, Beijing (CN); Xian Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 211 days.

(21) Appl. No.: 18/044,398

(22) PCT Filed: Nov. 5, 2021

(86) PCT No.: PCT/CN2021/128967
§ 371 (c)(1),
(2) Date: Mar. 8, 2023

(87) PCT Pub. No.: WO2022/205915
PCT Pub. Date: Oct. 6, 2022

(65) Prior Publication Data
US 2023/0336699 A1    Oct. 19, 2023

(30) Foreign Application Priority Data
Mar. 31, 2021 (CN) .......................... 202110350583.0

(51) Int. Cl.
*H04N 9/64* (2023.01)
*G06T 3/40* (2024.01)
(Continued)

(52) U.S. Cl.
CPC ............... *H04N 9/646* (2013.01); *G06T 3/40* (2013.01); *G06T 5/00* (2013.01); *G06T 11/001* (2013.01);
(Continued)

(58) Field of Classification Search
CPC ............... H04N 9/646; H04N 9/67–69; H04N 9/73–77; H04N 7/01–0117;
(Continued)

(56) References Cited

U.S. PATENT DOCUMENTS 5,258,829 A    11/1993  Matsunaga et al.
8,600,159 B2  12/2013  Greenebaum et al.
(Continued)

FOREIGN PATENT DOCUMENTS

CN    101494774 A       7/2009
CN    101377917 B   *   4/2011    ....... H04N 21/44008
(Continued)

OTHER PUBLICATIONS

International Search Report (with English translation) and Written Opinion for corresponding PCT Application No. PCT/CN2021/128967, dated Jan. 28, 2022, 10 pages.
(Continued)

*Primary Examiner* — Wesner Sajous
(74) *Attorney, Agent, or Firm* — Dority & Manning, P.A.

(57) ABSTRACT

A video processing method includes: obtaining a video signal, a color gamut range of the video signal including at least two color zones, each of the color zones corresponding to a set of correction data; performing chromatic calibration on the video signal, including correcting image data of the video signal in a color zone using a set of correction data corresponding to the color zone; and outputting the video signal that has undergone the chromatic calibration.

20 Claims, 14 Drawing Sheets

(51) Int. Cl.
*G06T 5/00* (2024.01)
*G06T 11/00* (2006.01)
*H04N 1/60* (2006.01)
*H04N 5/57* (2006.01)
*H04N 7/01* (2006.01)
*H04N 9/67* (2023.01)

(52) U.S. Cl.
CPC ............. *H04N 7/0117* (2013.01); *H04N 9/64* (2013.01); *H04N 9/67* (2013.01); *G06T 2207/10016* (2013.01); *G06T 2207/10024* (2013.01); *G06T 2207/20021* (2013.01)

(58) Field of Classification Search
CPC .......... H04N 7/012; H04N 7/125; H04N 1/56; H04N 1/60; H04N 1/6002; H04N 1/6019; H04N 5/445; H04N 5/45; H04N 5/57–58; H04N 1/6027; H04N 1/6041; H04N 1/6058; H04N 1/6077; H04N 1/6086; G06T 11/001; G06T 3/40; G06T 5/00; G06T 2207/10016; G06T 2207/10024; G06T 2207/20021; G09G 5/02; G09G 5/06
See application file for complete search history.

(56) References Cited

U.S. PATENT DOCUMENTS

| | | | |
|---|---|---|---|
| 8,698,701 B2 * | 4/2014 | Margulis | G03B 21/206 345/1.1 |
| 9,918,095 B1 | 3/2018 | Strom et al. | |
| 2006/0023272 A1 | 2/2006 | Tezuka | |
| 2012/0051636 A1 | 3/2012 | Greenebaum et al. | |
| 2013/0125184 A1 | 5/2013 | Valente et al. | |
| 2014/0226064 A1 | 8/2014 | Hamamura | |
| 2015/0077631 A1 | 3/2015 | Yin et al. | |
| 2016/0373712 A1 | 12/2016 | Yamamoto et al. | |
| 2017/0070735 A1 | 3/2017 | Ramasubramonian et al. | |
| 2018/0096466 A1 | 4/2018 | Eto et al. | |
| 2018/0288381 A1 | 10/2018 | He et al. | |
| 2020/0366935 A1 | 11/2020 | Salehifar et al. | |
| 2021/0166611 A1 | 6/2021 | Duan | |

FOREIGN PATENT DOCUMENTS

| | | |
|---|---|---|
| CN | 102231787 A * | 11/2011 |
| CN | 102769759 A | 11/2012 |
| CN | 102801948 A | 11/2012 |
| CN | 104008535 A | 8/2014 |
| CN | 104036464 A | 9/2014 |
| CN | 205356397 U | 6/2016 |
| CN | 107958470 A | 4/2018 |
| CN | 108668122 A | 10/2018 |
| CN | 110087086 A | 8/2019 |
| CN | 110336961 A | 10/2019 |
| CN | 110944168 A | 3/2020 |
| WO | WO 2017003240 A1 | 1/2017 |

OTHER PUBLICATIONS

Supplementary European Search Report received in EP Application No. 15733261, dated May 23, 2017, 4 pages.

* cited by examiner

VIDEO PROCESSING METHOD, VIDEO PROCESSING DEVICE, AND DISPLAY DEVICE

CROSS-REFERENCE TO RELATED APPLICATIONS

This application is a national phase entry under 35 USC 371 of International Patent Application No. PCT/CN2021/128967, filed on Nov. 5, 2021, which claims priority to Chinese Patent Application No. 202110350583.0, filed on Mar. 31, 2021, which are incorporated herein by reference in their entirety.

TECHNICAL FIELD

The present disclosure relates to the field of display technologies, and in particular, to a video processing method, a video processing device and a display device.

BACKGROUND

Currently, 4K display devices are highly favored by consumers. A 4K display device refers to a display device with a resolution of 3840×2160; however, an 8K display device refers to a display device with a resolution of 7680×4320. It can be seen that the resolution of the 8K display device is 4 times that of the 4K display device, that is, two times that of the 4K display device in each of horizontal and vertical directions. With a better display effect and better visual experience brought by a higher resolution, display devices with an 8K resolution have great business prospects.

SUMMARY

In one aspect, a video processing method is provided. The method includes: obtaining a video signal, a color gamut range of the video signal including at least two color zones, each of the at least two color zones corresponding to a set of correction data; performing chromatic calibration on the video signal, including correcting image data in a color zone of the at least two color zones in the video signal using a set of correction data corresponding to the color zone; and outputting the video signal that has undergone the chromatic calibration.

In some embodiments, the video signal includes pixel values of a plurality of pixels. A value range of a pixel value of a pixel in the plurality of pixels is divided into a plurality of value intervals, and a value interval of the plurality of value intervals corresponds to one of the at least two color zones. Correcting the image data of the video signal in the color zone using the set of correction data corresponding to the color zone includes: correcting a pixel value of a pixel in a value interval corresponding to the color zone using a set of correction data corresponding to the value interval in which the pixel value is located, so as to obtain a corrected pixel value of the pixel.

In some embodiments, each set of correction data in sets of correction data corresponding to the at least two color zones is obtained through a reference matrix.

In some embodiments, at least one set of correction data is obtained by performing following steps: initializing a set of correction data corresponding to a value interval into the reference matrix; correcting a representative value in the value interval using the set of correction data corresponding to the value interval to obtain a corrected value; driving at least one pixel using the corrected value to obtain XYZ color space chromatic coordinates of a color presented by the at least one pixel; obtaining a difference value between the XYZ color space chromatic coordinates of the color presented by the at least one pixel when driven by the corrected value and XYZ color space chromatic coordinates corresponding to the corrected value in a high-definition digital video standard; if an absolute value of the difference value is greater than a target threshold, adjusting the set of correction data corresponding to the value interval, and returning to a step of correcting the representative value in the value interval using the set of correction data corresponding to the value interval to obtain another corrected value; and if the absolute value of the difference value is not greater than the target threshold, a latest set of correction data being used as the set of correction data corresponding to the value interval.

In some embodiments, the reference matrix A satisfies following conditions:

$$A = N_{Panel}^{-1} M_{standard}, \text{ where}$$

$$N_{Panel} = \begin{pmatrix} x_1 & x_2 & x_3 \\ y_1 & y_2 & y_3 \\ z_1 & z_2 & z_3 \end{pmatrix} \begin{pmatrix} S_1 & 0 & 0 \\ 0 & S_2 & 0 \\ 0 & 0 & S_3 \end{pmatrix} \text{ or}$$

$$M_{standard} = \begin{pmatrix} x_1 & x_2 & x_3 \\ y_1 & y_2 & y_3 \\ z_1 & z_2 & z_3 \end{pmatrix} \begin{pmatrix} S_1 & 0 & 0 \\ 0 & S_2 & 0 \\ 0 & 0 & S_3 \end{pmatrix};$$

$$\text{and } \begin{pmatrix} S_1 \\ S_2 \\ S_3 \end{pmatrix} = \begin{pmatrix} x_1 & x_2 & x_3 \\ y_1 & y_2 & y_3 \\ z_1 & z_2 & z_3 \end{pmatrix}^{-1} \begin{pmatrix} \frac{x_w}{y_w} \\ 1 \\ \frac{z_w}{y_w} \end{pmatrix}$$

In a condition of determining $N_{Panel}$, $x_1$, $y_1$ and $z_1$ are XYZ color space chromatic coordinates of a color presented by a pixel when driven by a first value that has not been corrected; $x_2$, $y_2$ and $z_2$ are XYZ color space chromatic coordinates of a color presented by the pixel when driven by a second value that has not been corrected, $x_3$, $y_3$ and $z_3$ are XYZ color space chromatic coordinates of a color presented by the pixel when driven by a third value that has not been corrected, and $x_w$, $y_w$ and $z_w$ are XYZ color space chromatic coordinates of a color presented by the pixel when driven by a seventh value that has not been corrected.

In a condition of determining $M_{standard}$, $x_1$, $y_1$ and $z_1$ are XYZ color space chromatic coordinates corresponding to the first value in a high-definition digital video standard, $x_2$, $y_2$ and $z_2$ are XYZ color space chromatic coordinates corresponding to the second value in the high-definition digital video standard, $x_3$, $y_3$ and $z_3$ are XYZ color space chromatic coordinates corresponding to the third value in the high-definition digital video standard, and $x_w$, $y_w$ and $z_w$ are XYZ color space chromatic coordinates corresponding to the seventh value in the high-definition digital video standard.

The first value, the second value, the third value and the seventh value each include a first color sub-pixel value, a second color sub-pixel value and a third color sub-pixel value. A first color sub-pixel value of the first value is a maximum value; a second color sub-pixel value of the first value is equal to 0, and a third color sub-pixel value of the first value is equal to 0. A first color sub-pixel value of the second value is equal to 0, a second color sub-pixel value of the second value is the maximum value, and a third color sub-pixel value of the second value is equal to 0. A first color sub-pixel value of the third value is equal to 0, a second color sub-pixel value of the third value is equal to 0, and a third color sub-pixel value of the third value is the maximum value. A first color sub-pixel value, a second color sub-pixel value and a third color sub-pixel value of the seventh value are all equal and are each the maximum value.

In some embodiments, the plurality of value intervals include at least two of following eight value intervals: a first value interval in which a first color sub-pixel value is greater than 0, a second color sub-pixel value is equal to 0, and a third color sub-pixel value is equal to 0; a second value interval in which the first color sub-pixel value is equal to 0, the second color sub-pixel value is greater than 0, and the third color sub-pixel value is equal to 0; a third value interval in which the first color sub-pixel value is equal to 0, the second color sub-pixel value is equal to 0, and the third color sub-pixel value is greater than 0; a fourth value interval in which the first color sub-pixel value and the second color sub-pixel value are equal and are greater than 0, and the third color sub-pixel value is equal to 0; a fifth value interval in which the first color sub-pixel value is equal to 0, and the second color sub-pixel value and the third color sub-pixel value are equal and are greater than 0; a sixth value interval in which the first color sub-pixel value and the third color sub-pixel value are equal and are greater than 0, and the second color sub-pixel value is equal to 0; a seventh value interval in which the first color sub-pixel value, the second color sub-pixel value and the third color sub-pixel value are all equal and are all greater than 0; and an eighth value interval in which the first color sub-pixel value, the second color sub-pixel value and the third color sub-pixel value are not equal and are all greater than 0.

In some embodiments, each set of correction data in sets of correction data corresponding to the at least two color zones is obtained through a reference matrix, and a set of correction data corresponding to the eighth value interval is the reference matrix.

In some embodiments, each value interval of the first value interval to the seventh value interval includes a representative value, and chromatic coordinates xy of a color presented by the pixel in a case where the pixel value of the pixel is the representative value of the value interval are closer to chromatic coordinates xy corresponding to the representative value in a high-definition digital video standard than chromatic coordinates xy of a color presented by the pixel in a case where the pixel value of the pixel is a value other than the representative value in the value interval.

In some embodiments, each value interval of the first value interval to the seventh value interval includes a representative value, and chromatic coordinates xy of a color presented by the pixel in a case where the pixel value of the pixel is the representative value of the value interval are approximately equal to chromatic coordinates xy corresponding to the representative value in a high-definition digital video standard.

In some embodiments, representative values of the first value interval to the seventh value interval are a first value; a second value, a third value, a fourth value; a fifth value, a sixth value and a seventh value, respectively. A first color sub-pixel value of the first value is a maximum value, a second color sub-pixel value of the first value is equal to 0, and a third color sub-pixel value of the first value is equal to 0. A first color sub-pixel value of the second value is equal to 0, a second color sub-pixel value of the second value is the maximum value, and a third color sub-pixel value of the second value is equal to 0. A first color sub-pixel value of the third value is equal to 0, a second color sub-pixel value of the third value is equal to 0, and a third color sub-pixel value of the third value is the maximum value. A first color sub-pixel value and a second color sub-pixel value of the fourth value are equal and are the maximum value each, and a third color sub-pixel value of the fourth value is equal to 0. A first color sub-pixel value of the fifth value is equal to 0, and a second color sub-pixel value and a third color sub-pixel value of the fifth value are equal and are the maximum value each. A first color sub-pixel value and a third color sub-pixel value of the sixth value are equal and are the maximum value each, and a second color sub-pixel value of the sixth value is equal to 0. A first color sub-pixel value, a second color sub-pixel value and a third color sub-pixel value of the seventh value are all equal and are the maximum value each.

In some embodiments, obtaining the video signal includes: receiving a first video signal, the first video signal including first pixel values of a plurality of pixels; preprocessing the first video signal to obtain a second video signal, including converting the first video signal into the second video signal having a first preset video format, the second video signal including second pixel values of the plurality of pixels; and obtaining the video signal based on the second video signal.

In some embodiments, the first video signal includes a plurality of video sub-signals. Converting the first video signal into the second video signal having the first preset video format includes: performing pixel rearrangement on the plurality of first pixel values in the plurality of video sub-signals in the first video signal, so as to obtain a third video signal including at least one image matrix, each image matrix of the at least one image matrix including first pixel values, and a number of rows of the image matrix and a number of columns of the image matrix being respectively equal to a row resolution and a column resolution of a first resolution included in the first preset video format; and converting the third video signal into the second video signal having the first preset video format.

In some embodiments, the plurality of video sub-signals include four video sub-signals; each video sub-signal includes four video division signals, each video division signal includes a plurality of data units, and each data unit includes a first pixel value of at least one pixel in the plurality of pixels. Performing the pixel rearrangement on the plurality of first pixel values in the plurality of video sub-signals in the first video signal, so as to obtain the third video signal including the at least one image matrix, includes: for each video sub-signal, arranging four data units in a same ordinal position in the four video division signal into a first matrix, the first matrix including two rows and two columns of data units; and arranging first matrices in a same ordinal position in the four video sub-signals into a second matrix; the second matrix including two rows and two columns of first matrices, so as to obtain the image matrix including a plurality of second matrices; or, for each video sub-signal, arranging four data units in a same ordinal position in the four video division signals into a first matrix, and arranging first matrices in the video sub-signal into a third matrix, the first matrix including two rows and two columns of data units; and arranging four third matrices corresponding to the four video sub-signals into the image matrix, the image matrix including two rows and two columns of third matrices.

In some embodiments, performing the pixel rearrangement on the plurality of first pixel values in the plurality of video sub-signals in the first video signal, so as to obtain the third video signal including the at least one image matrix, includes: arranging first pixel values in each video sub-signal into a fourth matrix: and arranging four fourth matrices corresponding to the four video sub-signals into the image matrix, the image matrix including two rows and two columns of fourth matrices.

In some embodiments, the first preset video format includes at least one of a color mode, a color depth and a frame rate, and a first resolution.

In some embodiments, in a case where a resolution of the first video signal is less than the first resolution, converting the first video signal into the second video signal having the first preset video format includes: converting the first video signal into a fourth video signal having a second preset video format, wherein the second preset video format includes a second resolution, and other parameters of the second preset video format except for the second resolution are same as parameters of the first preset video format except for the first resolution; and adjusting a resolution of the fourth video signal to obtain the second video signal having the first preset video format.

In some embodiments, the video processing method further includes: receiving an on-screen display (OSD) trigger command; and in response to the OSD trigger command, superimposing OSD information onto the video signal that has undergone the chromatic calibration. Outputting the video signal that has undergone the chromatic calibration includes: outputting the video signal superimposed with the OSD information.

In yet another aspect, a video processing device is provided. The video processing device includes a processor and a memory. The memory has stored thereon computer program instructions. The processor is configured to execute the computer program instructions, so as to cause the video processing device to implement the video processing method as described in any one of the above embodiments.

In yet another aspect, a data processing device is provided. The video processing device is a chip, and the chip is configured to perform image processing in accordance with the video processing method as described in any of the above embodiments.

In yet another aspect, a display device is provided. The display device includes a display module and the video processing device as described in any of the above embodiments. The display module is used for displaying an image that has been processed by the video processing device.

In yet another aspect, a non-transitory computer-readable storage medium is provided. The non-transitory computer-readable storage medium has stored thereon computer program instructions, and the computer program instructions are configured to, when run on a display device, cause the display device to execute the video processing method as described in any of the above embodiments.

BRIEF DESCRIPTION OF THE DRAWINGS

In order to describe the technical solutions in the present disclosure more clearly, the accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, and are not limitations on actual sizes of products, actual processes of methods or actual timings of signals involved in the embodiments of the present disclosure.

DETAILED DESCRIPTION

Figure 1:
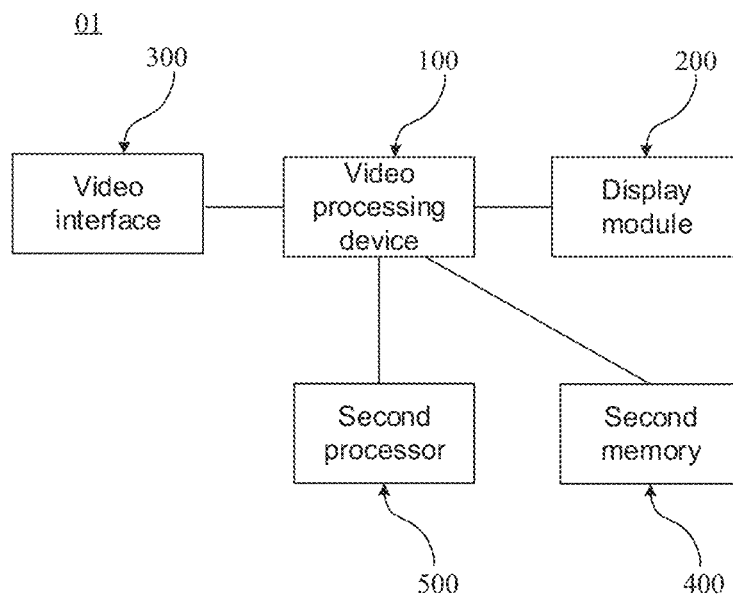
FIG. 1 is a structural diagram of a display device, in accordance with some embodiments of the present disclosure.

The technical solutions in the embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive meaning, i.e., "including, but not limited to". In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representation of the above terms does not necessarily refer to the same embodiment(s) or example(s). In addition, the specific features, structures, materials or characteristics may be included in any one or more embodiments or examples in any suitable manner.

Hereinafter, the terms such as "first" and "second" are only used for descriptive purposes, and are not to be construed as indicating or implying the relative importance or implicitly indicating the number of indicated technical features. Thus, the features defined with "first" and "second" may explicitly or implicitly include one or more of the features. In the description of the embodiments of the present disclosure, the term "multiple", "a plurality of" or "the plurality of" means two or more unless otherwise specified.

In the description of some embodiments, the terms "coupled", "connected" and derivatives thereof may be used. For example, the term "connected" may be used when describing some embodiments to indicate that two or more components are in direct physical or electrical contact with each other. For another example, the term "coupled" may be used in the description of some embodiments to indicate that two or more components are in direct physical or electrical contact. The term "coupled" or "communicatively coupled", however, may also mean that two or more components are not in direct contact with each other, but still cooperate or interact with each other. The embodiments disclosed herein are not necessarily limited to the content herein.

The phrase "at least one of A, B and C" has the same meaning as the phrase "at least one of A, B or C", and both include the following combinations of A, B and C: only A, only B, only C, a combination of A and B, a combination of A and C, a combination of B and C, and a combination of A, B and C.

The phrase "A and/or B" includes three combinations: only A, only B, and a combination of A and B.

As used herein, the term "if" is, optionally, construed as "when", "in a case where", "in response to determining" or "in response to detecting", depending on the context. Similarly, depending on the context, the phrase "if it is determined that" or "if [a stated condition or event] is detected" is optionally construed as "in a case where it is determined that", "in response to determining that", "in a case where [the stated condition or event] is detected", or "in response to detecting [the stated condition or event]".

The phase "applicable to" or "configured to" as used herein indicates an open and inclusive expression, which does not exclude devices that are applicable to or configured to perform additional tasks or steps.

In addition, the phrase "based on" as used herein is meant to be open and inclusive, since a process, step, calculation or other action that is "based on" one or more of the stated conditions or values may, in practice, be based on additional conditions or value exceeding those stated.

The terms such as "about," "substantially," or "approximately" as used herein include a stated value and an average value within an acceptable range of deviation of a particular value. The acceptable range of deviation is determined by a person of ordinary skill in the art in consideration of the measurement in question and errors associated with measurement of a particular quantity (i.e., limitations of a measurement system).

Exemplary embodiments are described herein with reference to sectional views and/or plan views as idealized exemplary drawings. In the drawings, thicknesses of layers and sizes of regions are enlarged for clarity. Therefore, variations in shape with respect to the drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown as a rectangle generally has a feature of being curved. Thus, the regions shown in the drawings are schematic in nature, and their shapes are not intended to show actual shapes of regions in a device, and are not intended to limit the scope of the exemplary embodiments.

In order to achieve a better color display effect, there's a need to perform chromatic calibration on a display device, so as to convert an actual color gamut of the display device into a standard color gamut (such as BT.709). In a conversion process, it's very common to use a three-dimensional look up table (3DLUT), mainly for realizing loading of a color look up table and calculation of a three-dimensional interpolation. The color look up table refers to a three-dimensional mapping table of discrete original color data and corrected color data, and the color data is composed of three components (such as red (R), green (G), and blue (B) components). The original color data is divided into minimal cubic units composed of adjacent grid points through discrete sampling at equal intervals on the three components of the original color data, Several points are extracted around the input original color data. These points must be able to form a closed polygon, and then three-dimensional interpolation is performed on data inside the polygon. However, the calculation of the three-dimensional interpolation occupies a large amount of hardware multiplier resources, which is not conducive to cost optimization. For a high-resolution display device (such as an 8K display device), in order to achieve a better display effect through chromatic calibration, the requirements on hardware resources will be correspondingly higher, and it will be more difficult to control production costs.

To solve this problem, some embodiments of the present disclosure provide a display device. For example, the display device may be: a display, a television, a billboard, a digital photo frame, a laser printer having a display function, a telephone, a mobile phone, a personal digital assistant (PDA), a digital camera, a portable camcorder, a viewfinder, a navigator, a vehicle display device, a home appliance, an information inquiry equipment (e.g., small and medium-size display devices in business inquiry devices of an e-government department, a bank, a hospital, an electric power department, and other departments, or large-size display devices for meeting users' need of displaying various shared information and comprehensive information in a large area in the field of large post and telecommunications systems, radio and television broadcasting, security monitoring, military command, industrial process control, traffic management command, public security command and monitoring, various kinds of production scheduling, communication network management, energy distribution and transportation, etc.) For example, the display device may also be a monitor, such as a broadcast-grade monitor.

In some embodiments of the present disclosure, referring to FIG. 1, the display device 1 includes a video processing device 100, a display module 200 and video interface(s) 300.

At least one video interface 300 is configured to receive a first video signal, for example, a video signal sent by an external device such as a camera and a video recorder (e.g., a hard disk video recorder). The video interface 300 may include at least one of a high definition multimedia interface (HDMI), a digital video interface (DVI), and a serial digital interface (SDI), and other types of interfaces. The same type of video interfaces may also be divided into video interfaces of different standards. For example, the SDIs may be divided into standard definition serial digital interfaces (SD-SDIs) with a maximum transmission rate of 270 Mb/s, high definition serial digital interfaces (HD-SDIs) with a maximum transmission rate of 1.485 Gb/s, 3 Gbps serial digital interface (3G-SDIs) with a maximum transmission rate of 2.97 Gb/s, and 12 Gbps serial digital interface (12G-SDIs) with a maximum transmission rate of 12 Gb/s, etc.

Figure 2:
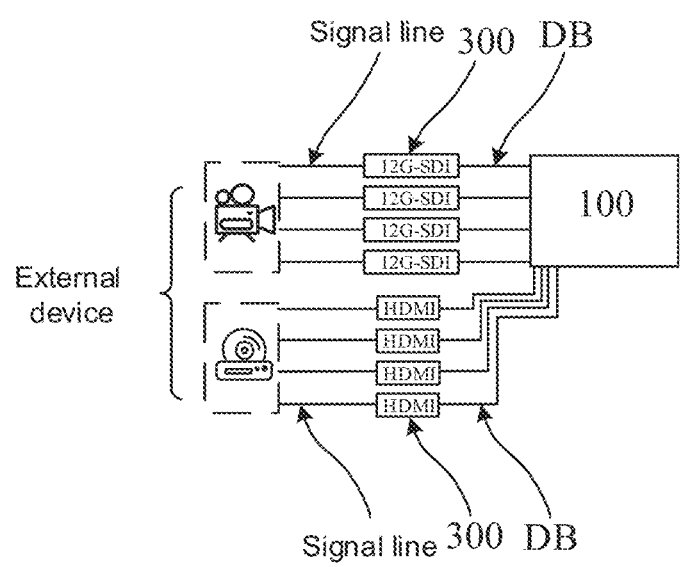
FIG. 2 is a structural diagram showing a connection between an external device and a video processing device, in accordance with some embodiments of the present disclosure.

For example, referring to FIG. 2, the display device 1 may receive first video signals with different resolutions (also referred to as video resolutions or image resolutions) through at least one video interface 300 (e.g., a plurality of video interfaces 300). It will be understood that video interfaces capable of transmitting video signals having a high resolution are backward compatible with video signals having a resolution less than the high resolution. For example, the at least one video interface 300 may include four 12G-SDIs. The display device 1 may receive a first video signal with an 8K resolution (7680×4320) (which may be referred to as an 8K video signal) through the four 12G-SDIs; since the video interface is backward compatible, the display device 1 may also receive a first video signal with a 4K resolution (3840×2160) (which may be referred to as a 4K video signal) through the four 12G-SDIs; and it may also receive a first video signal with the 4K resolution through one 12G-SDI. For another example, the at least one video interface 300 further includes four HEM& The display device 1 may receive a first video signal with an 8K resolution through the four 12G-SDIs, and may also receive a first video signal with a 4K resolution through four HDMIs or one HDMI.

The video processing device 100 is configured to perform a video processing method, and the video processing method may include: receiving the first video signal input through the at least one video interface 300, processing the received first video signal to generate a corresponding data signal, and transmitting the data signal to the display module 200. For example, the video processing device 100 transmits the data signal to a timing controller (TOON) in the display module 200.

Figure 3:
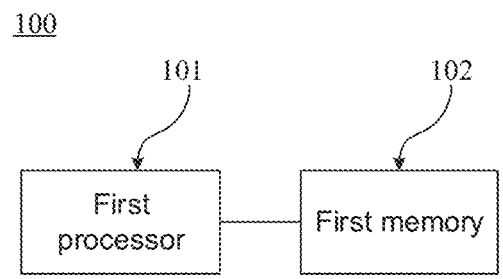
FIG. 3 is a structural diagram of a video processing device, in accordance with some embodiments of the present disclosure.

For example, referring to FIG. 3, the video processing device 100 includes a processor 101 (for the sake of distinction, the processor is hereinafter referred to as a first processor) and a memory 102 (for the sake of distinction, the memory is hereinafter referred to as a first memory). The first memory 102 has stored thereon computer program instructions, and the first processor 101 is configured to run the computer program instructions in the memory to cause the video processing device 100 to perform the video processing method.

The first memory 102 may include a high-speed random access memory, a non-volatile memory such as a magnetic disk storage device and a flash memory device, a read-only memory (ROM) or other types of static storage devices that can store static information and instructions, a random access memory (RAM) or other types of dynamic storage devices that can store information and instructions, or a one time programmable memory (GTP), an electrically erasable programmable read-only memory (EEPROM), a magnetic disk storage medium or other magnetic storage devices, or any other media capable of carrying or storing program codes in the form of instructions or data structures and capable of being accessed by a computer, but is not limited thereto. The first memory 102 may exist independently and be connected to the first processor 101 through a communication line. Alternatively, the first memory 102 may be integrated with the first processor 101.

The first processor 101 is used for implementing video processing, which may be one or more general-purpose central processing units (CPUs), microcontroller units (MCUs), logic devices, application-specific integrated circuits (ASICs), graphics processing units (GPUs), or integrated circuits for controlling program execution in some embodiments of the present disclosure. The CPU may be a single-core processor (single-CPU) or a multi-core processor (multi-CPU). The processor herein may refer to one or more devices, circuits or processing cores for processing data (e.g. computer program instructions).

For example, the video processing device 100 is a chip, which is configured to perform the video processing method. For example, the chip may be a programmable logic device, for example, may be an ASIC, which includes a field programmable gate arrays (FPGA) and a complex programming logic device (CPLD): it may also be a graphics processing unit (GPU, which is also referred to as a display core, a display chip), etc.

Figure 4:
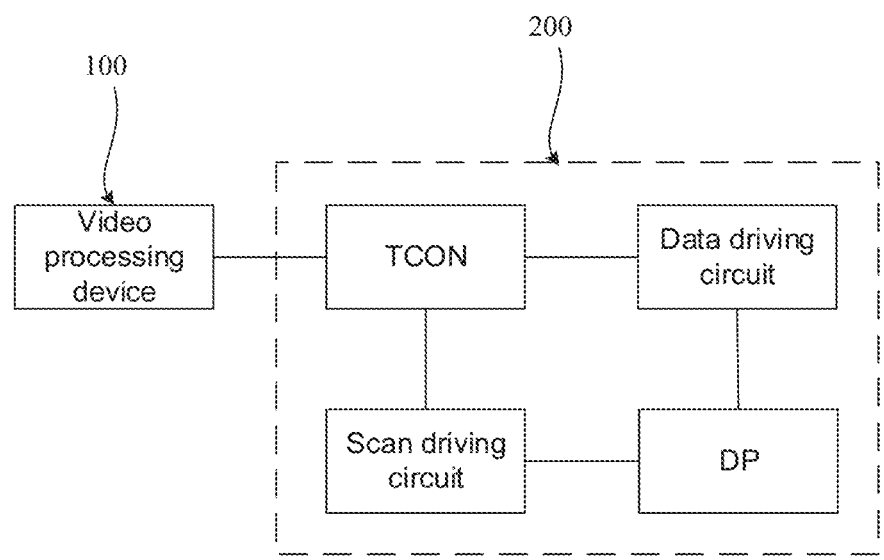
FIG. 4 is a structural diagram of a display module, in accordance with some embodiments of the present disclosure.

The display module 200 may be configured to display an image according to the data signal obtained after being processed by the video processing device 100. For example, referring to FIG. 4, the display module 200 includes the TCON, a data driving circuit, a scan driving circuit and a display panel (DP). The TCON is used for converting the data signal and a control signal received from the outside (the video processing device 100) into another data signal and another control signal suitable for the data driving circuit (i.e., a source driving circuit) and the scanning driving circuit, so as to realize image display of the display panel. An input interface of the TCON generally includes at least one of a transistor-transistor logic (TTL) interface, a low voltage differential signaling (LVDS) interface, an embedded displayport (eDP) interface or a V-by-One interface, and an output interface of the TCON generally includes at least one of a TTL interface, a mini-LVDS interface or a reduced swing differential signaling (RSDS) interface. Each type of interface has a specific format and characteristic in transmitting signals.

The display panel may be an organic light emitting diode (OLED) panel, a quantum dot light emitting diode (QLED) panel, or a liquid crystal display (LCD) panel, a micro LED (including a Mini LED or a Micro LED) panel, etc.

For example, the display panel includes a plurality of sub-pixels, and the plurality of sub-pixels are located in an active area (AA). For example, the plurality of pixels are arranged in an array. For example, sub-pixels arranged in a line in a direction are referred to as sub-pixels in a same row, and sub-pixels arranged in a line in another direction are referred to as sub-pixels in a same column.

For example, the plurality of sub-pixels include first color sub-pixels, second color sub-pixels and third color sub-pixels. For example, a first color, a second color and a third color are three primary colors. For example, the first color, the second color and the third color are red, green, and blue, respectively. That is, the plurality of sub-pixels include red sub-pixels, green sub-pixels and blue sub-pixels.

The data driving circuit may be a source driving chip, such as a driver integrated circuit (IC), which is bonded to the display panel. The data driving circuit is configured to provide driving signals (also referred to as data driving signals, i.e., voltages corresponding to a digital video signal) to all the sub-pixels in the display panel in response to the another data signal (i.e., the digital video signal) and the another control signal sent by the TCON.

The scan driving circuit may be a scan driving chip, such as a driver IC, which is bonded to the display panel. The driver IC may be disposed in the display panel, in which case it may be referred to a gate driver on array (GOA, which means a scan driving circuit disposed on an array substrate). The scan driving circuit is configured to provide a scan signal for each row of sub-pixels P in the display panel in response to the control signal sent by the TCON.

For example, the display module further includes a touch panel (also referred to as a touch screen, a touch structure or a touch layer). The touch panel is used for sensing touch positions. By using the touch panel to sense the touch positions, it may be possible to control an image displayed on the display panel, thereby realizing human-computer interaction.

In some other embodiments of the present disclosure, referring to FIG. 1, the display device 1 further includes a second memory 400. The second memory 400 is configured to store data used by the video processing device 100 when performing at least one step of the video processing method. For example, the video processing device 100 needs the second memory 400 to buffer image data during frame rate conversion and frame synchronization.

As for a type of the second memory 400, reference may be made to the first memory 102. For example, the second memory 400 is a double data rate synchronous dynamic random access memory (DDR SDRAM).

In some other embodiments of the present disclosure, the second memory 400 is integrated in the video processing device 100. For example, the second memory 400 and the first memory 102 are the same memory.

In some other embodiments of the present disclosure, the display device 1 further includes a second processor 500.

The second processor 500 is configured to receive an on-screen display (OSD) operation command, and send OSD information to the video processing device 100 in response to the OSD operation command, so that the video processing device 100 uses the OSD information to perform at least one step in the video processing method. For example, the second processor 500 receives the OSD operation command sent by a user through a remote controller, a side button of the display device, or other control manners, and send OSD image information to the video processing device 100 through an LVDS interface or other video interfaces in response to the received OSD operation command, so that the video processing device 100 superimposes an OSD menu corresponding to the OSD image information onto a video signal to obtain a data signal to be displayed. The second processor 500 may also send OSD control information (including adjustable parameters on the OSD menu) to the video processing device 100 through an inter-integrated circuit (I2C) interface in response to the OSD operation command, so as to update a value in a register corresponding to the OSD control information (i.e., a register corresponding to parameters) in the video processing device 100, so that the video processing device 100 uses the updated value in the register to perform at least one step in the video processing method.

For example, as for a type of the second processor 500, reference may be made to the first processor 101. For example, the second processor 500 may be a MCU. For example, the second processor 500 may also be a system on chip (SOC), which is not limited thereto.

It will be noted that, for the sake of clarity and conciseness, the embodiments of the present disclosure do not enumerate all constituent units of the display device 1. In order to realize necessary functions of the display device, those skilled in the art may provide and arrange other unshown constituent units according to specific needs, which is not limited in the embodiments of the present disclosure.

Based on the display device 1 described above, some embodiments of the present disclosure provide a video processing method, an execution subject of which may be the video processing device 100, or may be a product including the video processing device 100, such as the display device 1.

For example, the video processing method includes the following steps.

In step one, a video signal is obtained.

For example, a color gamut range of the obtained video signal includes at least two color zones, and each color zone corresponds to a set of correction data. The video signal may be a video signal directly received from an external device without any adjustment in parameters, or may be a video signal that has been processed and adjusted in terms of parameters, which is not limited here.

The color gamut range of the video signal may be divided into a plurality of color zones. Those skilled in the art may choose any division manner of the color zones as they wish. For example, referring to FIG. 16, the color gamut range may be divided into seven color zones of the three primary colors of red, green, and blue, and a mixture of red and blue, a mixture of red and green, a mixture of blue and green, and a mixture of red, green and blue. For another example, a pure white color zone may be added on the basis of the foregoing division, and the color gamut range is divided into eight color zones.

In step two, chromatic calibration is performed on the obtained video signal.

For example, performing the chromatic calibration on the obtained video signal includes: correcting image data of the video signal in a color zone using a set of correction data corresponding to the color zone. Different correction data are used to correct parts of the video signal in different color zones, so that the chroma may be corrected more finely to achieve a better color display effect.

In step three, the video signal that has undergone the chromatic calibration is output.

For example, outputting the video signal that has undergone the chromatic calibration may be directly outputting the video signal that has undergone the chromatic calibration, or may be outputting the video signal that has undergone the chromatic calibration and other processings, which is not limited thereto.

For example, as for step one, reference may be made to the following S101, S102, and S201 to S207. As for step two, reference may be made to the following S208. As for step three, reference may be made to S105.

Figure 5:
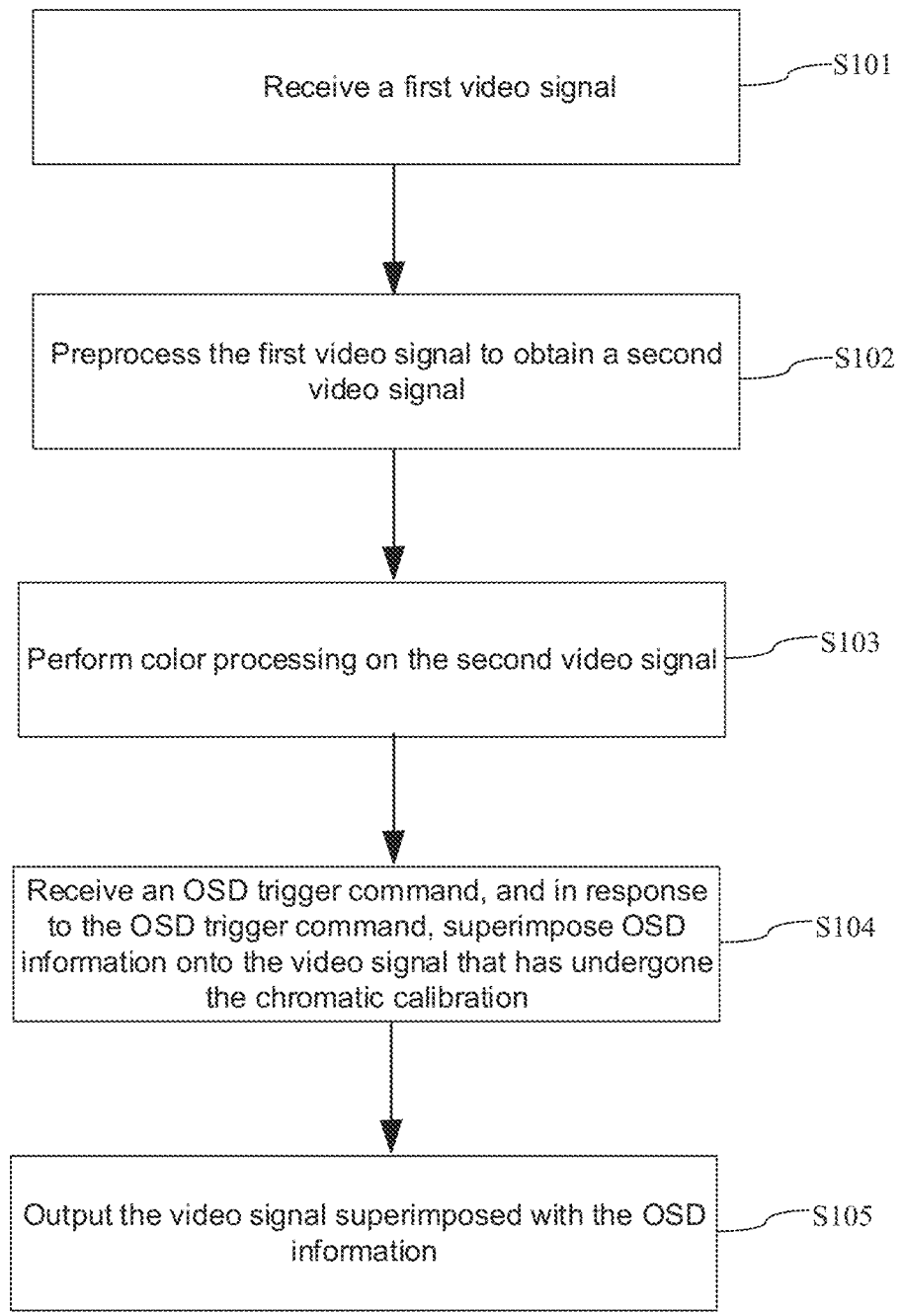
FIG. 5 is a flow diagram of a video processing method, in accordance with some embodiments of the present disclosure.

As shown in FIG. 5, the video processing method may include the following steps.

In S101, a first video signal is received.

In some embodiments of the present disclosure, receiving the first video signal includes: receiving the first video signal from an external device (e.g., a camera or a dedicated signal generator), the first video signal being a serial digital signal including at least one video sub-signal (e.g., may be one or more video sub-signals), and each video sub-signal including first pixel values of a plurality of pixels. A first pixel value of each pixel is color information of the pixel. It can be understood that if a color space (also referred to as chromaticity space, color system or color model) is different, the first pixel value is expressed in different ways. For example, the first pixel value includes a first color sub-pixel value, a second color sub-pixel value and a third color sub-pixel value. For example, in a case where the color space is a red-green-blue (RGB) color space, the first color sub-pixel value is an R component, the second color sub-pixel value is a G component, and the third color sub-pixel value is a B component. In this case, a value range of each component is, for example, 0 to 255.

For example, a resolution of the first video signal is not limited, and the video processing method is applicable to first video signals of different resolutions. For example, the first video signal may be a 4K video signal, an 8K video signal, or other high-resolution video signals.

For example, the video processing device 100 is compatible with processing of first video signals with 4K and 8K resolutions. The display device 1 includes four 12G-SDIs/3G-SDIs and four HDMIs. The video processing device 100 may receive a first video signal with an 8K resolution transmitted through four 12G-SDIs or four HDMIs; and it may also receive a first video signal with a 4K resolution transmitted through four HDMIs or one 12G-SDI.

For example, referring to FIG. 2, the external device is a camera, and the camera may be connected to the video interface(s) 300 through at least one (e.g., four) signal line (also referred to as video line, transmission line, connecting line, etc.), so as to transmit the first video signal to the video interface(s) 300 to realize reception of the video signal. The video line may be an SDI line, an HDMI line, a DVI line, etc., which is not limited thereto, as long as it can be matched and connected with the video interface 300.

Referring to FIG. 2, after receiving the video signal from the external device, the video interface(s) 300 may transmit the received first video signal to the video processing device 100 through at least one (e.g., four) data bus (DB).

Next, S102 is performed.

In S102, the first video signal is preprocessed to obtain a second video signal.

Preprocessing the first video signal to obtain the second video signal includes: converting the first video signal into a second video signal having a first preset video format. The second video signal includes second pixel values of the plurality of pixels.

The first preset video format includes at least one of a color format and a frame rate, and a first resolution. Parameters of the first preset video format may be configured according to actual conditions. For example, referring to FIG. 6, pixel rearrangement may be performed on the first video signal through S1021, so as to convert the first video signal into a third video signal including at least one image matrix (e.g., a plurality of image matrices), the image matrix referring to a matrix composed of a plurality of pixel values. A color format of each first pixel value of the at least one image matrix (e.g., each image matrix) in the third video signal is converted into the color format of the first preset video format through S1022. Frame rate conversion is performed on the third video signal that has undergone the color format conversion through S1023, so as to adjust a frame rate of the third video signal to the frame rate of the first preset video format. Frame synchronization is performed on the third video signal after frame rate adjustment through S1024.

In some examples, if parameters of a video format of the first video signal are the same as some parameters of the first preset video format, corresponding steps of converting such parameters may not be performed. For example, assuming that the color format of the first preset video format is YCbCr444, if the color format of the first video signal is RGB, then the color format of the first video signal may be converted through S1022; if the color format of the first video signal is YCbCr444, then there's no need to perform S1022. In some other examples, if the parameters of the video format of the first video signal are the same as the parameters of the first preset video format, corresponding steps of converting such parameters may still be performed, but the parameters will not be changed by the performing of the steps.

In addition, the first resolution may be a highest resolution displayable by the display module 200. For example, the first resolution may be one of 2K (1920×1080), 4K, 8K, etc. For example, the first resolution is 8K. In this case, if the resolution of the first video signal is the same as the first resolution, there's no need to convert the resolution of the first video signal; otherwise, the resolution of the first video signal needs to be converted to 8K.

Figure 6:
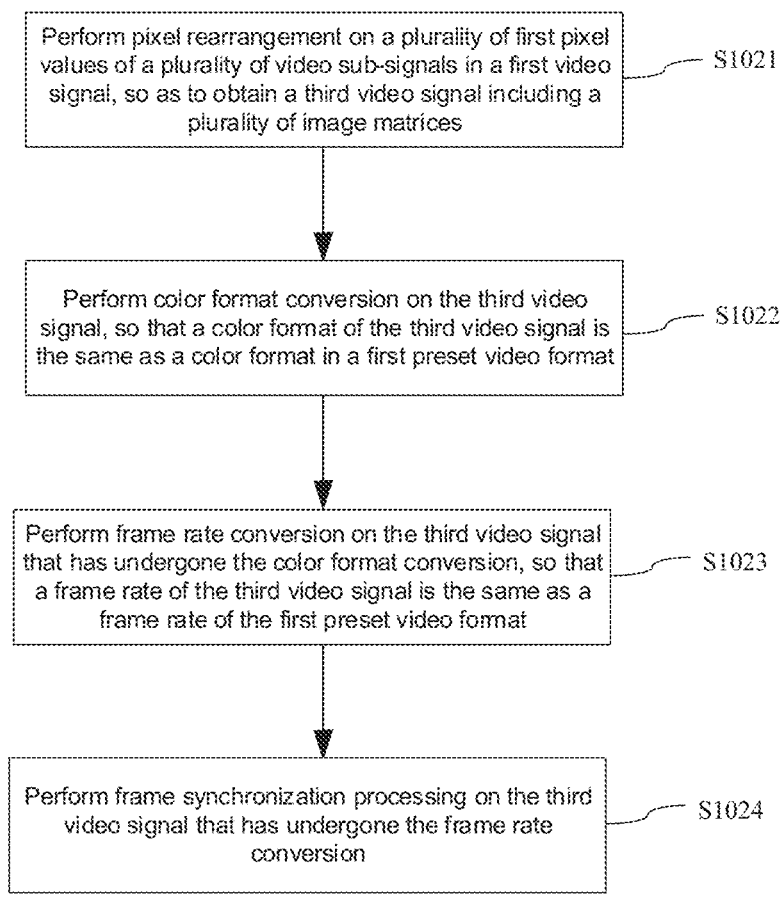
FIG. 6 is a flow diagram of a process of converting a first video signal into a second video signal having a first preset video format, in accordance with some embodiments of the present disclosure.

For example, the resolution of the first video signal is 8K, and includes a plurality of (e.g., may be four) video sub-signals. Referring to FIG. 6, S102 may include S1021 to S1024.

In S1021, the pixel rearrangement is performed on a plurality of first pixel values of the plurality of video sub-signals in the first video signal, so as to obtain the third video signal including the plurality of image matrices. Each image matrix includes a plurality of first pixel values, and a number of columns and a number of rows of the image matrix are respectively equal to a row resolution and a column resolution of the first resolution.

Figure 7:
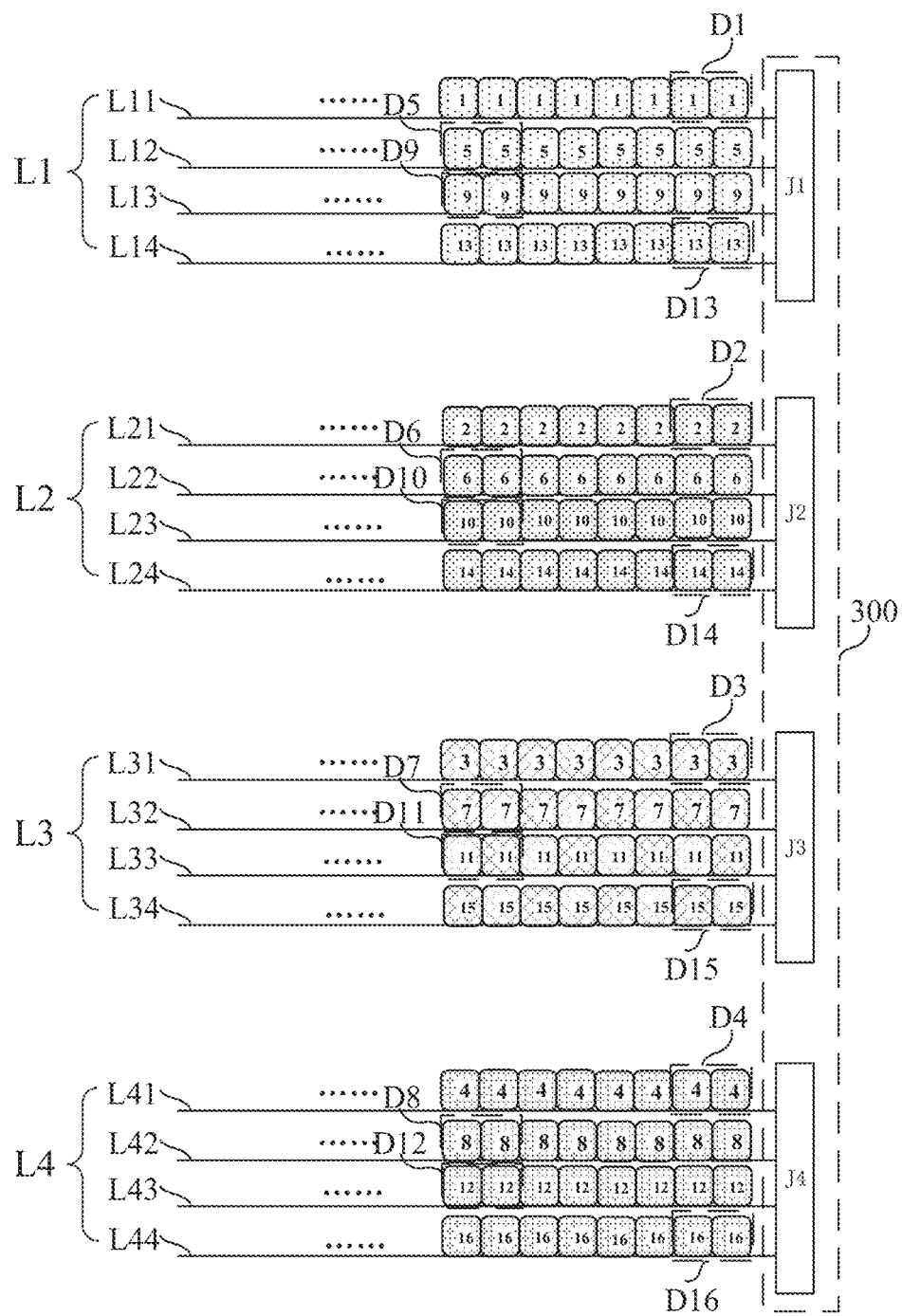
FIG. 7 is a schematic diagram showing a type of transmission of sub-signals of in a process of a pixel rearrangement, in accordance with some embodiments of the present disclosure.
Figure 8:
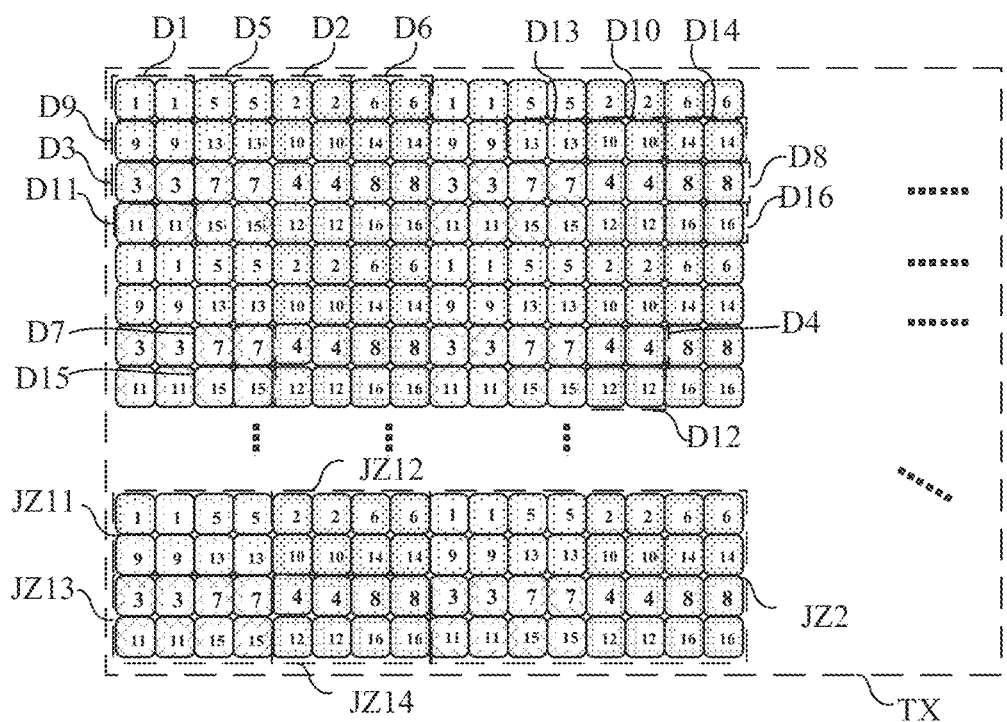
FIG. 8 is a schematic diagram of a process of a pixel rearrangement; in accordance with some embodiments of the present disclosure.

In some embodiments of the present disclosure, referring to FIGS. 7 and 8, the resolution of the first video signal is 8K, and the first video signal is transmitted to the video processing device 100 through four 12G-SDIs. The four 12G-SDIs are respectively a first video interface J1, a second video interface J2, a third video interface J3 and a fourth video interface J4. Each 12G-SDI receives one video sub-signal, and each video sub-signal includes four video division signals. Each video division signal is one of a plurality of parallel video streams obtained after the first processor 101 splits a serial digital signal received by a video interface 300 according to a corresponding technical standard. Each video division signal includes a plurality of data units, each data unit includes a first pixel value of at least one pixel (e.g., two first pixel values of two pixels), and first pixel values in a same data unit are consecutive first pixel values. It will be understood that, two adjacent first pixel values, when received through a same video interface, are two consecutive first pixel values. In a case where the resolution of the first video signal is 8K and the first video signal is received through four 12G-SDIs, the first video signal may be split according to the SMPTE ST2082-12 technical standard; in a case where the resolution of the first video signal is 4K and the first video signal is received through at least one (e.g., one) 12G-SDI, the first video signal may be split according to the SMPTE ST2082-10 technical standard. Those skilled in the art may implement the above process according to a corresponding technical standard as needed, and details are not limited in the present disclosure.

For example, as shown in FIG. 7, the first video signal includes four video sub-signals, and the four video sub-signals are respectively a first video sub-signal L1, a second video sub-signal L2; a third video sub-signal L3 and a fourth video sub-signal L4. The first video sub-signal L1 includes four video division signals, which are respectively denoted as L11, L12, L13 and L14. The video division signal L11 includes a plurality of data units D1, the video division signal L12 includes a plurality of data units D5, the video division signal L13 includes a plurality of data units D9, and the video division signal L14 includes a plurality of data units D13. The data unit D1 includes two adjacent first pixel values 1; the data unit D5 includes two adjacent first pixel values 5, the data unit D9 includes two adjacent first pixel values 9, and the data unit D13 includes two adjacent first pixel values 13. The four video division signals L11 to L14 are received by the first video interface J1 synchronously; that is, at a same time (which may be understood as a very short period of time), one data unit D1, one data unit D5, one data unit D9 and one data unit D13 of the four video division signals are received by the first video interface J1. The data units D1, D5, D9 and D13 received by the first video interface J1 at the same time are data units in a same ordinal position. The description of the second video sub-signal L2 to the fourth video sub-signal L4 are similar to the description of the first video sub-signal L1, and details are not repeated here.

For example, as shown in FIG. 8, each group of four data units D1, D5, D9 and D13 in the same ordinal position are arranged into a first matrix JZ11 with two rows and two columns, and a plurality of groups of data units D1, D5, D9 and D13 in the same ordinal position are arranged into a plurality of first matrices JZ11. Similar to the first video sub-signal L1, a plurality of groups of data units D2, D6, D10 and D14 in the same ordinal position in the second video sub-signal L2 are arranged into a plurality of first matrices JZ12, each first matrix JZ12 having two rows and two columns; a plurality of groups of data units D3, D7, D11 and D15 in the same ordinal position in the third video sub-signal L3 are arranged into a plurality of first matrices JZ13, each first matrix JZ13 having two rows and two columns; and a plurality of groups of data units D4, D8, D12 and D16 in the same ordinal position in the fourth video sub-signal L4 are arranged into a plurality of first matrices JZ14, each first matrix JZ14 having two rows and two columns. Four first matrices JZ11, JZ12, JZ13 and JZ14 in the same ordinal position from the four video sub-signals are arranged into a second matrix JZ2, and each second matrix JZ2 includes two rows and two columns of first matrices. A plurality of second matrices JZ2 are arranged into an image matrix TX. The number of first pixel values included in each column of the image matrix TX is the number of rows of the image matrix TX, the number of first pixel values included in each row of the image matrix TX is the number of columns of the image matrix TX, and the number of rows and the number of columns of the image matrix TX are equal to the column resolution and the row resolution of the first resolution, respectively. For example, the first resolution of the first preset video format is 8K; as for the image matrix TX formed by the pixel rearrangement method in the embodiments, the number of rows of the image matrix TX is 4320, which is equal to the column resolution of the first resolution, and the number of columns of the image matrix TX is 7680, which is equal to the row resolution of the first resolution. That is, the image matrix TX in FIG. 8 is, for example, an 8K image; the 8K image is composed of 16 sub-images, and each sub-image has a resolution of 1920× 1080 and is composed of first pixel values with a same ordinal position. Based on this, serial data signals transmitted by the plurality of video sub-signals of the first video signal are rearranged into the third video signal including an image, pixel values of the image being arranged into a matrix.

Figure 9:
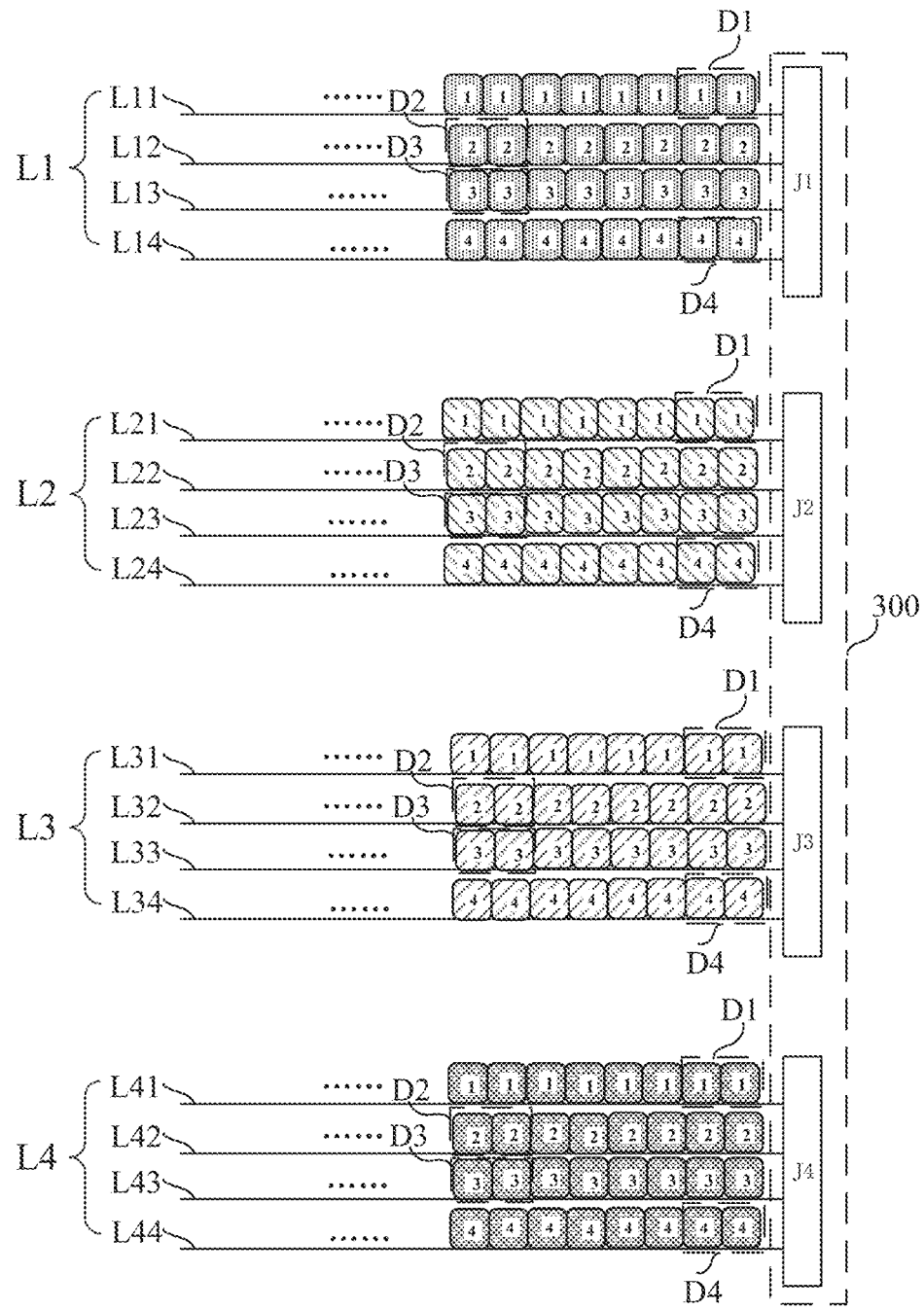
FIG. 9 is a schematic diagram of another type of transmission of sub-signals in a process of a pixel rearrangement; in accordance with some embodiments of the present disclosure.
Figure 10:
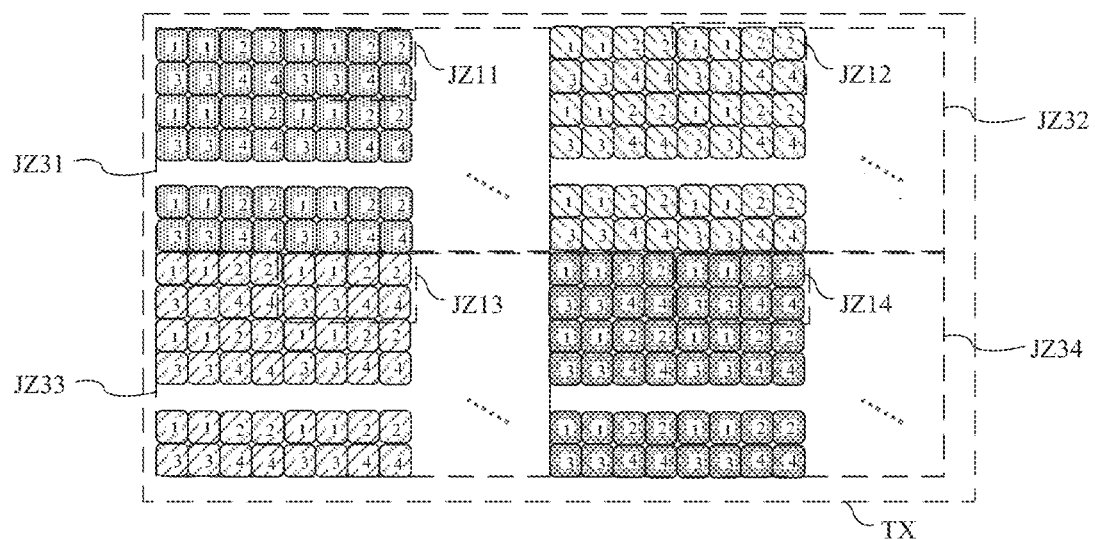
FIG. 10 is a schematic diagram of a process of another pixel rearrangement, in accordance with some embodiments of the present disclosure.

In some embodiments of the present disclosure, referring to FIGS. 9 and 10, the resolution of the first video signal is 8K, and the first video signal is transmitted to the video processing device 100 through four 12G-SDIs. Each 12G-SDI receives one video sub-signal, and each video sub-signal includes four video division signals L11 to L14. The video division signal L11 includes a plurality of data units D1, the video division signal L12 includes a plurality of data units D2, the video division signal L13 includes a plurality of data units D3, and the video division signal L14 includes a plurality of data units D4. The data unit D1 includes two adjacent first pixel values 1, the data unit D2 includes two adjacent first pixel values 2, the data unit D3 includes two adjacent first pixel values 3, and the data unit D4 includes two adjacent first pixel values 4. The four video division signals L11 to L14 are received by the first video interface J1 synchronously; that is, at the same time, one data unit D1, one data unit D2, one data unit D3 and one data unit D4 of the four video division signals are received by the first video signal interface J1. The data units D1, D2, D3 and D4 received by the first video signal interface J1 at the same time are data units in the same ordinal position. The description of the second video sub-signal L2 to the fourth video sub-signal L4 are similar to the description of the first video sub-signal L1, and details are not repeated here.

For example, in the first video sub-signal L1, each group of four data units D1, D2, D3 and D4 in the same ordinal position are arranged into a first matrix JZ11 with two rows and two columns, and a plurality of groups of data units D1, D2, D3 and D4 in the same ordinal position are arranged into a plurality of first matrices JZ11, each first matrix JZ11 having two rows and two columns Similar to the first video sub-signal L1, a plurality of groups of data units D1, D2, D3 and D4 in the same ordinal position in the second video sub-signal L2 are arranged into a plurality of first matrices JZ12, each first matrix JZ12 having two rows and two columns; a plurality of groups of data units D1, D2, D3 and D4 in the same ordinal position in the third video sub-signal L3 are arranged into a plurality of first matrices JZ13, each first matrix JZ13 having two rows and two columns; and a plurality of groups of data units D1, D2, D3 and D4 in the same ordinal position in the fourth video sub-signal L4 are arranged into a plurality of first matrices JZ14, each first matrix JZ14 having two rows and two columns. A plurality of first matrices in each video sub-signal are arranged into a third matrix. For example, the plurality of first matrices JZ11 are arranged into a third matrix JZ31, and the number of rows and the number of columns of the third matrix JZ31 are equal to ½ of the column resolution and ½ of the row resolution of the first resolution, respectively; the plurality of first matrices JZ12 are arranged into a third matrix JZ32; the plurality of first matrices JZ13 are arranged into a third matrix JZ33; and the plurality of first matrices JZ14 are arranged into a third matrix JZ34. The four third matrices JZ31, JZ32, JZ33 and JZ34 corresponding to the four video sub-signals are arranged into an image matrix TX. The number of rows and the number of columns of the image matrix TX are equal to the column resolution and the row resolution of the first resolution, respectively. For example, the image matrix TX in FIG. 10 is, for example, an 8K image, and the 8K image is composed of four first sub-images (i.e., four third matrices), and a resolution of each first sub-image is 3840×2160. Each first sub-image is composed of four second sub-images; and each second sub-image has a resolution of 1920×1080, and is composed of first pixel values with a same ordinal position.

Figure 11:
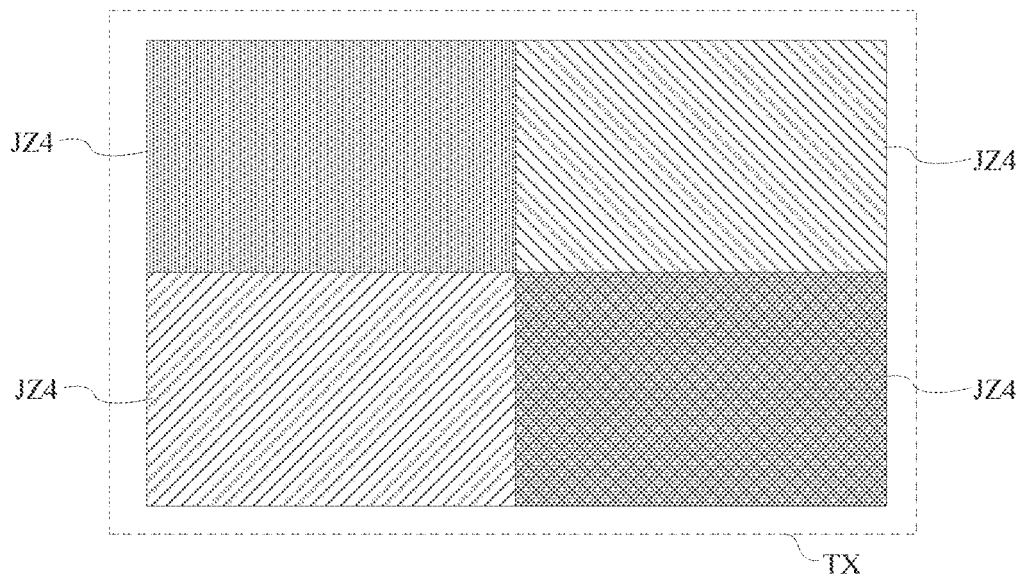
FIG. 11 is a schematic diagram of a process of yet another pixel rearrangement, in accordance with some embodiments of the present disclosure.

In some embodiments of the present disclosure, referring to FIG. 11, the resolution of the first video signal is 8K, and the first video signal is transmitted to the video processing device 100 through four HDMIs. Each HDMI receives one video sub-signal, and each video sub-signal includes a plurality of first pixel values. For example, the first pixel values in each video sub-signal are arranged row by row to form a fourth matrix JZ4, and the number of rows and the number of columns of the fourth matrix JZ4 are equal to ½ of the column resolution and ½ of the row resolution of the first resolution, respectively. For example, the plurality of first pixel values in each video sub-signal are arranged row by row according to an order in which they reach a corresponding HDMI, and the number of first pixel values in each row is ½ of the column resolution. The four fourth matrices JZ4 corresponding to the four video sub-signals are arranged into an image matrix TX with two rows and two columns. The number of rows and the number of columns of the image matrix TX are respectively equal to the column resolution and the row resolution of the first resolution.

In S1022, color format conversion is performed on the third video signal, so that a color format of the third video signal is the same as the color format of the first preset video format.

For example, a color format includes a color space and a color depth. In order to describe a color accurately and define the color in multiple dimensions, the color space is used to give an abstract mathematical description of the color. Common color spaces include an RGB color space, a cyan, magenta, yellow and black (CMYK) color space, a luminance-chrominance (YUV) color space, etc. In the field of display technologies, the color may be represented in a digitally quantified way; that is, a magnitude of each color component in the color space determines a color to be displayed, and each color component occupies a certain number of bits (digits). The color depth is the number of digits used to store color information of a single pixel, which is also referred to as bits per pixel (bpp). The higher the color depth, the more the available colors. Commonly used color depths are 8-bit, 10-bit, 12-bit, 24-bit and 32-bit. For example; color formats corresponding to the RGB color space are RGB565, RGB666, RGB888, etc. Considering the color format RGB888 as an example, RGB888 means that each component of R, G and B is represented by 8 bits, a range of each component is 0 to 255, a color depth is 24 bits, and the total number of colors that can be represented is 16 megabits (i.e., (2 to the power of 24) bits); that is, a color space size of RGB888 is 16 megabits (M). Different color formats of a same color space may be converted to each other, and different color formats of different color spaces may also be converted to each other.

In some embodiments of the present disclosure, the video interface of the display device 1 may receive a plurality of color formats of a plurality of color spaces. For example, the video interface of the display device 1 receives the first video signal in a plurality of color formats such as RGB565/ 666/888, YCbCr444/422/420, etc., and the different color formats have the same or different color depths. In order to facilitate subsequent color processing, the color formats need to be unified, that is, the color formats need to be converted into a preset color format of the first preset video format. Since the pixel rearrangement does not affect color information of the video signal, color information of the third video signal obtained by the pixel rearrangement is still the same as color information of the first video signal. For example, chromatic resampling and/or color space conversion may be performed on the third video signal, so as to convert the color format of the third video signal to the color format of the first preset video format for unification. The step of performing the chromatic resampling is used for adjusting a color depth of an input video signal having the same color space as the first preset video format but a different color format, without changing the color space. The step of performing the color space conversion is used for changing a color space and a color depth of an input video signal having a different color space and a different color format from the first preset video format. After the chromatic resampling and the color space conversion, the color format and the color space of the third video signal are the color format and the color space of the first preset video format, respectively.

For example, after the chromatic resampling, it may be possible to change the color format of the third video signal having a color space same as the color space of the first preset video format but a color depth different from the color depth of the first preset video format to the color format of the first preset video format. For example, the color format of the first preset video format is YCbCr444, and the color format of the third video signal is YCbCr422, YCbCr420 or YCbCr411; after the chromatic resampling, the color format of the third video signal becomes YCbCr444.

For another example, in a case where the color space in the color format of the third video signal is different from the color space in the color format of the first preset video format, the color space conversion may be directly performed on the third video signal. For example, the color space of the first preset video format is YCbCr, the color format of the first preset video format is YCbCr444, and the color format of the third video signal is RGB888; without the chromatic resampling, the color format of the third video signal is still RGB888; after the color space conversion, the color space of the third video signal is converted to YCbCr, and the color format of the third video signal is converted to YCbCr444.

In S1023, frame rate conversion is performed on the third video signal that has undergone the color format conversion, so that a frame rate of the third video signal is the same as a frame rate of the first preset video format.

For example, the frame rate (expressed in frames per second (FPS)) refers to the number of frames refreshed per second. The higher the frame rate, the smoother the content displayed in the video. Common frame rates are 30 FPS, 50 FPS, 60/1.001 FPS, 60 FPS, etc. In order to achieve a better display effect and facilitate subsequent processings, there's a need to perform frame rate conversion on the third video signal after the color format conversion, so that the frame rate of the third video signal that has undergone the frame rate conversion is the frame rate of the first preset video format. If the frame rate of the third video signal is the same as the frame rate of the first preset video format, then S1023 may be performed, but the result of performing S1023 is that the frame rate of the third video signal is not changed. Alternatively, this step may not be performed.

In a case where the frame rate of the third video signal before the frame rate conversion is less than the frame rate of the first preset video format, the frame rate conversion is implemented in the form of frame interpolation. For example, a plurality of frames of images in the third video signal are written into a memory (e.g., the second memory 400) at a certain frame rate, and the plurality of frames of images are read from the memory at the frame rate of the first preset video format. If a writing speed is lower than a reading speed, once the memory is empty, a current latest frame of image may be read repeatedly until a new image is written into the memory. In a case where the frame rate of the third video signal before the frame rate conversion is greater than the frame rate of the first preset video format (that is, the speed of writing images to the memory is greater than the speed of reading images from the memory), the frame rate conversion is implemented by discarding frame(s). The method of discarding frame(s) means that only a part of images written into the memory are read, and remaining images are not read. By interpolating or discarding frame(s), the frame rate of the video signal that has undergone the frame rate conversion is the same as the frame rate of the first preset video format. For example, the frame rate of the first preset video format is 60 FPS, and the frame rate of the third video signal is 50 FPS or 90 FPS; after the frame rate conversion, the frame rate of the third video signal becomes 60 FPS.

In S1024, frame synchronization processing is performed on the third video signal that has undergone the frame rate conversion.

When a video is played, each frame of image (also referred to as a video frame) has its own play moment (i.e., a presentation time stamp (PTS) of the video frame). In addition to receiving the video signal, the video processing device 100 may also obtain a time base and a PTS of each frame of image in the video signal. The play moment of each frame of image may be obtained by multiplying the PTS of the frame of image by the time base; and a unit of the play moment is second. A process of obtaining the time base of the video and outputting each frame of image in the video signal according to a respective PTS is referred to as a process of performing the frame synchronization processing.

For example, the video processing device 100 may first store the third video signal that has undergone the frame rate conversion in S1023 in the second memory 400, then read each frame of image from the second memory 400 according to the PTS of each frame of image in the third video signal (that is, the frame synchronization processing is performed), and next perform the following step S103 on each frame of image that is read. The second memory 400 used in S1024 and the second memory 400 used in S1023 may be the same or different. After a third video signal is obtained by performing S1021, as for another third video signal obtained after at least one of S1022, S1023 and S1024 is performed on the third video signal, as long as the obtained another third video signal has the first preset video format, it is called the second video signal. For example, the another third video signal obtained after S1022 and S1023 are performed is referred to as the second video signal. For another example, the another third video signal obtained after S1022, S1023 and S1024 are performed is referred to as the second video signal. In addition, if the second video signal having the first preset video format may be obtained after some of the steps in S1022 to S1024 are performed, then other steps in S1022 to S1024 may not be performed. For example, if the color format of the third video signal after S1021 is performed is the same as the color format of the first video format, then S1022 may not be performed.

The video processing method in the embodiments of the present disclosure may be backward compatible; that is, the method may be used to process a first video signal whose resolution is less than the first resolution, and the processing process includes step four and step five.

In step four, in a case where the resolution of the first video signal is less than the first resolution, the first video signal is converted into a fourth video signal having a second preset video format, the second preset video format including a second resolution, and other parameters of the second preset video format except for the second resolution being same as parameters of the first preset video format. For example, the second resolution is less than the first resolution. The following steps may be performed.

In step (1), pixel rearrangement is performed on the plurality of first pixel values of the plurality of video sub-signals in the first video signal to obtain a fifth video signal including a plurality of first image matrices TX1.

In some embodiments of the present disclosure, in a case where the resolution of the first video signal is 4K, that is, in a case where the resolution of the first video signal is less than the first resolution (which is 8K), the first video signal may be transmitted to the video processing device 100 through four 3G-SDIs, one 12G-SDI or one HDMI. The video processing device 100 performs the pixel rearrangement on the plurality of first pixel values in the plurality of video sub-signals in the first video signal, so as to convert the first video signal into a video signal having a plurality of first image matrices TX1. The number of columns and the number of rows of each first image matrix TX1 are respectively equal to a row resolution and a column resolution of the second resolution. It can also be said that the resolution of each first image matrix TX1 is the second resolution, or the resolution of the video signal obtained after the pixel rearrangement is the second resolution. For example, the second resolution included in the second preset video format may be equal to the resolution of the first video signal, e.g., 4K; that is, the pixel rearrangement may not change the resolution of the video signal.

Figure 12:
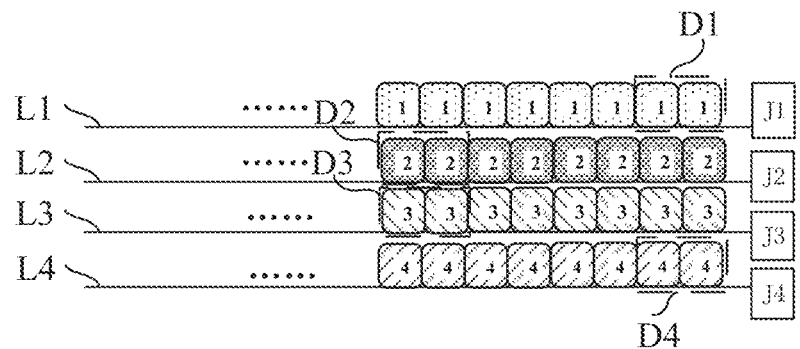
FIG. 12 is a schematic diagram of yet another type of transmission of sub-signals in a process of a pixel rearrangement, in accordance with some embodiments of the present disclosure.
Figure 13:
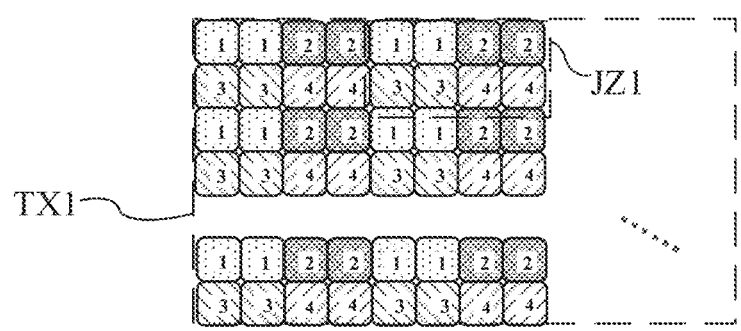
FIG. 13 is a schematic diagram of a process of yet another pixel rearrangement, in accordance with some embodiments of the present disclosure.

For example, referring to FIGS. 12 and 13, in a case where the first video signal with a resolution of 4K is received through four 3G-SDIs, the first video signal includes four video sub-signals, which are a first video sub-signal L1, a second video sub-signal L2, a third video sub-signal L3 and a fourth video sub-signal L4. The first video sub-signal L1 includes a plurality of data units D1, the second video sub-signal L2 includes a plurality of data units D2, the third video sub-signal L3 includes a plurality of data units D3, and the fourth video sub-signal L4 includes a plurality of data units D4. Each data unit D1 includes two adjacent first pixel values 1, each data unit D2 includes two adjacent first pixel values 2, each data unit D3 includes two adjacent first pixel values 3, and each data unit D4 includes two adjacent first pixel values 4. The four video sub-signals are respectively received by a first video interface J1 to a fourth video interface J4 synchronously: that is, at the same time (which may be understood as a very short time period), a data unit D1 of the first video sub-signal L1, a data unit D2 of the second video sub-signal L2, a data unit D3 of the third video sub-signal L3, and a data unit D4 of the fourth video sub-signal L4 are respectively received by the first video interface J1 to the fourth video interface J4 synchronously. Referring to FIG. 12, every four data units D1, D2, D3 and D4 in a same ordinal position are arranged into a first matrix JZ1 with two rows and two columns, and a plurality of first matrices JZ1 are arranged into a first image matrix TX1. The number of rows and the number of columns of the first image matrix TX1 are respectively equal to a column resolution and a row resolution of the second resolution (e.g., 4K).

Figure 14:
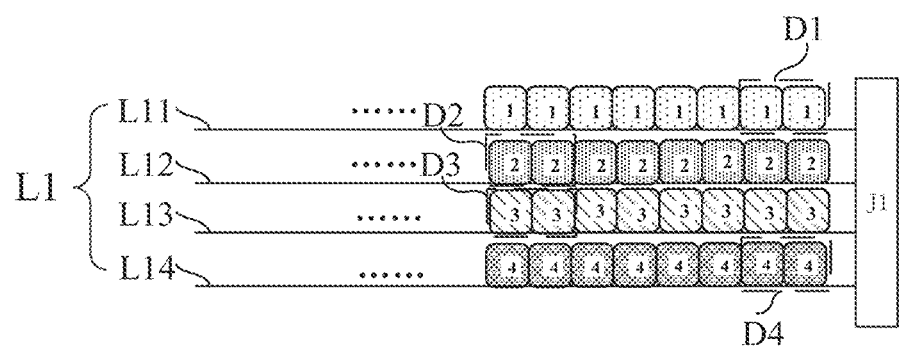
FIG. 14 is a schematic diagram of yet another type of transmission of sub-signals in a process of a pixel rearrangement, in accordance with some embodiments of the present disclosure.

For example, in a case where the resolution of the first video signal is 4K, the first video signal may be transmitted to the video processing device 100 through one 12G-SDI. Referring to FIG. 14, a video signal received by one 12G-SDI includes four video division signals, respectively, L11, L12, L13 and L14. The video division signal L11 includes a plurality of data units D1, the video division signal L12 includes a plurality of data unit D2, the video division signal L13 includes a plurality of data units D3, and the video division signal L14 includes a plurality of data units D4. The pixel rearrangement is performed on a plurality of first pixel values of the plurality of video division signals in the first video signal. As for a specific rearrangement manner, reference may be made to the rearrangement manner in the case where the first video signal is received through four 3G-SDIs. The first image matrix TX1 shown in FIG. 13 may be obtained, and details will not be repeated here.

For example, in a case where the resolution of the first video signal is 4K, the first video signal may be transmitted to the video processing device 100 through one HDMI. A plurality of first pixel values of the first video signal received through one HDMI are arranged row by row to form a first image matrix TX1. The number of rows and the number of columns of the first image matrix TX1 are equal to the column resolution and the row resolution in the second resolution, respectively.

In step (2), color format conversion is performed on the fifth video signal, so that a color format of the fifth video signal that has undergone the color format conversion is the same as a color format of the second preset video format. The color format of the first preset video format is the same as the color format of the second preset video format. As for a process of performing the color format conversion on the fifth video signal, reference may be made to step S1022 as described above, and details will not be repeated here.

In step (3), frame rate conversion is performed on the fifth video signal after the color format conversion, so that a frame rate of the fifth video signal that has undergone the frame rate conversion is the same as a frame rate of the second preset video format. The frame rate of the first preset video format is the same as the frame rate of the second preset video format. As for a process of performing the frame rate conversion on the fifth video signal, reference may be made to step S1023 as described above, and details will not be repeated here.

In step (4), frame synchronization processing is performed on the fifth video signal after the frame rate conversion. As for a specific process, reference may be made to step S1024 as described above, and details will not be repeated here.

After the fifth video signal is obtained by performing step (1), as for the fifth video signal obtained after at least one of steps (2) to (4) is performed on the fifth video signal, as long as the obtained fifth video signal has the second preset video format, the fifth video signal is referred to as the fourth video signal. For example, a fifth video signal obtained after S1022 and S1023 are performed is referred to as the fourth video signal. For another example, a fifth video signal obtained after S1022, S1023 and S1024 are performed is referred to as the fourth video signal. In addition, if the fourth video signal may be obtained after some steps of steps (2) to (4) are performed, then other steps of steps (2) to (4) may not be performed. For example, if the color format of the fifth video signal obtained after step (1) is performed is the same as the color format in the second video format, then step (2) may not be performed.

In step five, in a case where the resolution of the first video signal is less than the first resolution, a resolution of the fourth video signal is adjusted to obtain the second video signal having the first preset video format.

For example, the first resolution is 8K, the resolution of the first video signal is 4K, and correspondingly, the resolution of the fourth video signal is also 4K. In order to achieve a high-resolution image display, the resolution of the fourth video signal may be adjusted, so that the resolution of the fourth video signal is stretched to 8K. For example, a nearest neighbor convolution, bilinear convolution, bicubic convolution, or other methods may be used to stretch the resolution. Finally, the second video signal with a resolution of 8K is obtained.

In order to describe the technical solution clearly, the plurality of image matrices included in the third video signal described above are directly referred to as image matrices, the plurality of image matrices included in the fifth video signal described above are referred to as first image matrices, and the plurality of image matrices included in the second video signal are referred to as second image matrices. The second image matrix is formed by arranging a plurality of second pixel values into an array. For example, a processing process in S103 may be performed on each second image matrix of the second image matrices.

For example, in the video format of the second video signal, the resolution is 8K, the color space is YUV, the color format is YCbCr444, and the frame rate is 60 FPS. That is, the resolution of the second image matrix in the second video signal is 8K, and a color format of each second pixel value in the second image matrix is YCbCr444.

In S103, color processing is performed on the second video signal.

Figure 15:
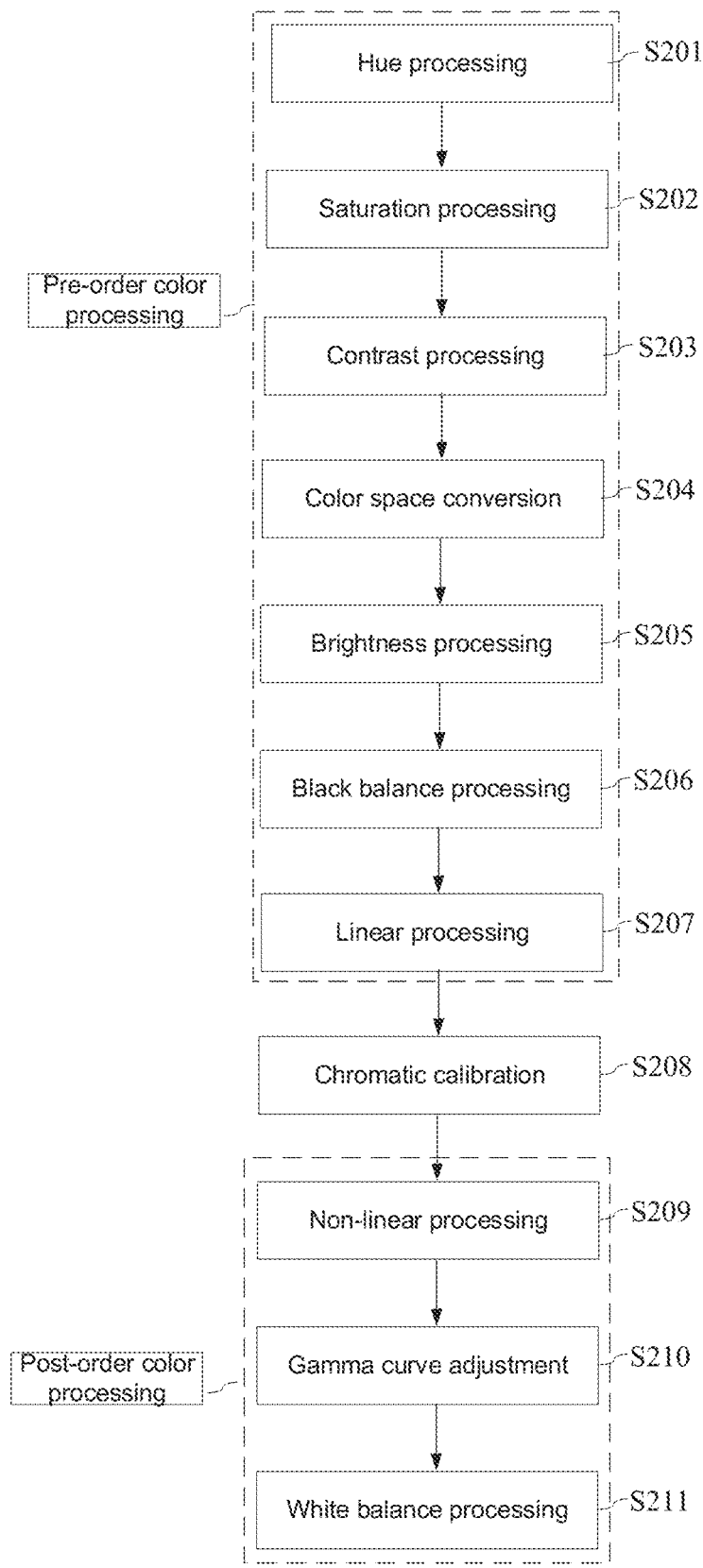
FIG. 15 is a flow diagram of a process of color processing, in accordance with some embodiments of the present disclosure.

In some embodiments of the present disclosure, a video signal on which chromatic calibration is to be performed may be obtained based on the second video signal. Referring to FIG. 15, pre-order color processing may be performed on the plurality of second pixel values in the second image matrix to obtain a video signal on which chromatic calibration is to be performed, the video signal including a plurality of pixel values. For example, the pre-order color processing includes at least one of hue processing, saturation processing, contrast processing, color space conversion, brightness processing, black balance processing, and linear processing. That is, at least one of S201 to S207 is performed on the second video signal to obtain the video signal on which the chromatic calibration is to be performed. In some other embodiments, the second video signal may be used as the video signal on which the chromatic calibration is to be performed.

Figure 17:
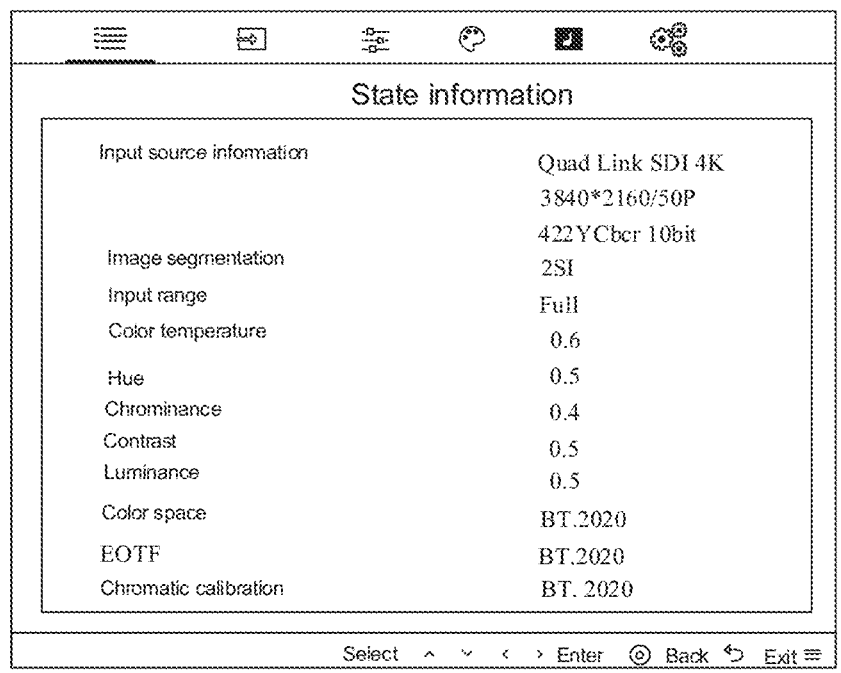
FIG. 17 is a schematic diagram of an on-screen display (OSD) menu, in accordance with some embodiments of the present disclosure.

In some embodiments of the present disclosure, the display device 1 including the video processing device 100 has an OSD function, and can display an OSD menu on the screen of the display device. Through various adjustable parameters on the OSD menu, users may adjust the display effect on their own, so as to meet users' different requirements on the theme of the displayed image. For example, the user may call out the OSD menu shown in FIG. 17 through a button provided on the remote controller or the display device, and the OSD menu may include hue, saturation, contrast, color space, brightness, black balance, electro-optical conversion function, photoelectrical conversion function, gamma curve, white balance and other adjustable parameters (the OSD menu in the drawing only shows an adjustment interface of some parameters). After calling out the OSD menu, the user may select a corresponding parameter and adjust a value of the selected parameter to adjust the display effect. For example, the user may not adjust the parameters, or may adjust one or several parameters of the user's choice, or may adjust all the parameters.

The process of color processing may be performed in a certain order, and regardless of whether the user has adjusted some parameters, the color processing may be performed according to a predetermined order. For example, the video processing device 100 performs a complete color processing process on an image matrix, which may include hue processing, saturation processing, contrast processing, color space conversion, brightness processing, black balance processing, linear processing, chromatic calibration, non-linear processing, gamma curve adjustment, white balance processing, and other steps that are performed in sequence. A value of a parameter used in each processing step may be a latest value of the parameter, and the latest value refers to a latest value of the parameter in the processing step at the time when the processing step is performed. For example, after the display device leaves the factory, if the parameters in the processing step have never been adjusted by the user, then the latest values of the parameters are default values (also referred to as preset values, i.e., values set before the display device leaves the factory). For another example, after the display device leaves the factory, if a parameter in the processing step has been adjusted by the user through the OSD menu, then the latest value of the parameter refers to the value after the last adjustment.

For example, a parameter of each item of color processing includes an adjustable range and a unit adjustment amount. The adjustable range and the unit adjustment amount are not limited and can be set by the manufacturers freely, as long as a corresponding image display effect can be adjusted by changing the parameter within the adjustable range. A degree to which the display effect is changed is determined by the adjustment amplitude. For example, for the parameter of contrast processing, an adjustment range is 0 to 1, and a unit adjustment amount is 0.1; alternatively, the adjustment range may be −10 to 10, and the unit adjustment amount is 1.

Since the color processing includes a plurality of steps performed in a predetermined order, an image matrix output from a former step is used as an input of a latter step. For example, after the hue processing is performed on each second pixel value in the second image matrix, a new second image matrix is obtained, the new second image matrix including a plurality of new second pixel values; and the saturation processing is performed on the new second image matrix.

In addition, in order to describe the technical solution clearly, an input of the step of performing the chromatic calibration in the color processing is referred to as the third image matrix. That is, at least one of hue processing, saturation processing, contrast processing, color space conversion, brightness processing, black balance processing and linear processing is performed on each second pixel value in the at least one second image matrix, so as to obtain a corresponding new second image matrix. If a next step to be performed on the new first image matrix is chromatic calibration, then the new second image matrix is referred to as the third image matrix; and the new second pixel values included in the new second image matrix are referred to as pixel values.

In S201, hue processing is performed.

Hue refers to a relative lightness and darkness of an image, represented as a color in a chromatic image, and may be generally divided into cool, warm and neutral hues. In the display device, the display of different hues is also achieved by adjusting a proportion of the color components. For example, the color space of the second video signal is YUV, and its color components include a luminance component Y and chromatic components U and V. When performing the hue processing, the video processing device 100 adjusts color components of each second pixel value in the at least one second image matrix based on a setup parameter p, and outputs a new group of color components Y', U' and V'. A value range of the setup parameter p is −1 to 1, and the user may adjust the setup parameter p through the OSD menu. Based on the setup parameter p, color components Y, U and V of each second pixel value may be converted to color components Y', U' and V' with reference to the following conditions:

$$Y'=Y$$

$$U'=U\times\cos(\theta)-V\times\sin(\theta)$$

$$V'=U\times\sin(\theta)+V\times\cos(\theta)$$

Here, $\theta=180p-90$

If the color format of the second video signal is YCbCr444, then the color component Cb of each second pixel value may be used as the color component U to be substituted into the above formula to get the color component Cb' (equivalent to the color component U'); and the color component Cr of each second pixel value may be used as the color component V to be substituted into the above formula to get the color component Cr' (equivalent to the color component V).

In S202; saturation processing is performed.

Saturation refers to a vividness of a color, which is also referred to as purity. The higher the purity; the brighter the color; the lower the purity; the duller the color. Similar to hue, saturation may also be adjusted by adjusting the proportion of the color components. For example, the video processing device 100 performs the saturation processing on a plurality of second pixel values included in each of at least one second image matrix (which may be obtained after S201) in the second video signal. When performing the saturation processing, the video processing device 100 may adjust the color components Y, U and V of each second pixel value based on a setup parameter β, and output a new group of color components Y', U', and V'. A value range of the setup parameter β is 0 to 1, and the user may adjust the setup parameter β through the 050 menu. The color components Y, U and V of each second pixel value may be converted to color components Y', U' and V' with reference to the following conditions:

$$Y' = Y$$

$$U' = \begin{cases} 0 & \text{if } (\beta = 0) \\ U \times (0.5 + \beta) & \text{if } (\beta > 0) \& (\beta < 0.5) \\ U \times 2 \times \beta & \text{if } (\beta \geq 0.5) \& (\beta \leq 1) \end{cases}$$

$$V' = \begin{cases} 0 & \text{if } (\beta = 0) \\ V \times (0.5 + \beta) & \text{if } (\beta > 0) \& (\beta < 0.5) \\ V \times 2 \times \beta & \text{if } (\beta \geq 0.5) \& (\beta \leq 1) \end{cases}$$

In S203, contrast processing is performed.

Contrast measures a difference between luminance levels of a brightest white and a darkest black in the light and dark regions of an image. The larger the difference, the greater the contrast. The less the difference; the less the contrast. Generally, the greater the contrast, the clearer and the more striking the image, and the more vivid and colorful the color. For example, the video processing device 100 performs the contrast processing on a plurality of second pixel values included in each of at least one second image matrix (which may be obtained after S202) in the second video signal. When performing the contrast processing, the video processing device 100 may adjust the color components Y, U and V of each second pixel value based on a setup parameter α, and output a new group of color components Y', U' and V. A value range of the setup parameter α is 0 to 1, and the user may adjust the setup parameter α through the OS menu. The color components Y, U and V of each second pixel value may be converted to color components Y', U' and V' with reference to the following conditions:

$$Y' = \begin{cases} 0 & \text{if } (\alpha = 0) \\ Y \times (0.5 + \alpha) & \text{if } (\alpha > 0) \& (\alpha < 0.5) \\ Y \times 2 \times \alpha & \text{if } (\alpha \geq 0.5) \& (\alpha \leq 1) \end{cases}$$

$$U' = \begin{cases} 0 & \text{if } (\alpha = 0) \\ U \times (0.5 + \alpha) & \text{if } (\alpha > 0) \& (\alpha < 0.5) \\ U \times 2 \times \alpha & \text{if } (\alpha \geq 0.5) \& (\alpha \leq 1) \end{cases}$$

$$V' = \begin{cases} 0 & \text{if } (\alpha = 0) \\ V \times (0.5 + \alpha) & \text{if } (\alpha < 0) \& (\alpha < 0.5) \\ V \times 2 \times \alpha & \text{if } (\alpha \geq 0.5) \& (\alpha \leq 1) \end{cases}$$

In S204, color space conversion is performed.

For example, color gamuts of color spaces specified by different high-definition digital video standards are different. When the referenced high-definition digital video standards are different, color components of different color spaces are converted by using different formulas, and correspondingly, color components of new color spaces obtained after the conversion are different. For example, if chromatic coordinates Y, Cb and Cr of a same group of YUV color space is converted according to BT.2020 (International Telecommunication Union Radiocommunication (ITU-R) Recommendation BT.2020), BT.709 (ITU-R Recommendation BT.709), and BT.601 (ITU-R Recommendation BT.601), since conversion coefficients are different, different color components of RGB color space will be obtained.

For example, if the chromatic coordinates of YUV color space are converted according to BT.601, then the color components of RGB color space are as follows:

$R = Y + 1.4075 \times Cr;$ $G = Y - 0.3455 \times Cb - 0.7169 \times Cr;$ $B = Y + 1.779 \times Cb;$ if the chromatic coordinates of YUV color space are converted according to BT.709, then the color components of RGB color space are as follows:

$R = Y + 1.5748 Cr;$ $G = Y - 0.1868 Cb - 0.4680 Cr;$ $B = Y + 1.856 Cb;$ and if the chromatic coordinates of YUV color space are converted according to BT.2020, then the color components of RGB color space are as follows:

$R = Y + 1.4746 \times Cr;$ $G = Y - 0.5714 \times Cb - 0.1646 \times Cr;$ $B = Y + 1.8814 \times Cb.$ For example, the OSD menu provides a variety of high-definition digital video standard options, such as BT.2020, BT.709, BT.601, DCI-P3 (Digital Cinema Initiatives-P3), and Rec.709. The user may select a high-definition digital video standard in the OSD menu, and the color components of the YUV color space of the second video signal are converted into chromatic coordinates of other color space through the color space conversion. For example, the color space of the second video signal is converted from the YUV color space to the RGB color space according to BT.709, and the color components Y, Cb and Cr are converted to chromatic coordinates R, G and B.

In S205, brightness processing is performed.

Brightness is a property of a color, and is also a dimension of a color space. For example, the video processing device 100 performs the brightness processing on a plurality of second pixel values included in each of at least one second image matrix (which may be obtained after S204) in the second video signal. During the brightness processing, the color components R, G and B may be adjusted based on a setup parameter ε, so as to output a new group of color components R', G' and B'. A value range of the setup parameter ε is 0 to 1, and the user may adjust the setup parameter c through the OSD menu. Color components R, G and B of each second pixel value may be converted to color components R', G' and B' with reference to the following conditions:

$R' = R + \varepsilon;$ $G' = G + \varepsilon;$ $B' = B + \varepsilon.$

In S206, black balance processing is performed.

For example, the video processing device 100 performs the black balance processing on a plurality of second pixel values included in each of at least one second image matrix (which may be obtained after S205) in the second video signal. During the black balance processing, the color components R, G and B may be adjusted based on three setup parameters $\phi_1$, $\phi_2$ and $\phi_3$, respectively, so as to output a new group of color components R', G' and B'. The setup parameters $\phi_1$, $\phi_2$ and $\phi_3$ are all integers, and value ranges thereof are all 0 to 1. The user may adjust the setup parameters $\phi_1$, $\phi_2$ and $\phi_3$ through the OSD menu. Color components R, G and B of each second pixel value may be converted to color components R', G' and B' with reference to the following conditions:

$$R'=R+\phi_1;$$

$$G'=G+\phi_2;$$

$$B'=B+\phi_3.$$

In S207, linear processing is performed.

In some embodiments of the present disclosure, a relationship between a signal received by the video interface and an actual image signal is non-linear. In order to maximize a color reproduction of the signal on the display module, there's a need to convert a non-linear signal into a linear signal through the linear processing (e.g., an electro-optical transfer function (EOTF) processing, also referred to as electro-optical conversion); that is, the linear processing defines how the data information in the video signal is displayed as visible light. Similar to the color space conversion, different high-definition digital video standards adopt different electro-optical conversion functions. Accordingly, in a case where the referenced high-definition digital video standards are different, the obtained EOTF curves will also be different.

For example, the OSD menu provides a variety of high-definition digital video standard options, such as BT.2020, BT.709, DCI-P3, and Rec.709. The user may select a high-definition digital video standard in the OSD menu, and the video processing device 100 will, according to the selected standard, convert an EOTF curve of the second video signal into a new EOTF curve corresponding to the selected standard through the linear processing. For example, the set high-definition digital video standard is BT.2020, and a corresponding electro-optical conversion function in the BT.2020 standard is:

$$L = \left( \frac{\max\left[\left(N^{\frac{1}{m_2}} - c_1\right), 0\right]}{c_2 - c_3 N^{\frac{1}{m_2}}} \right)^{\frac{1}{m_1}}.$$

Here, N represents a non-linear pixel coding value; and L represents a corresponding linear color value; $m_1=0.1593017578125$; $m_2=78.84375$; $c_1=0.8359375$; $c_2=18.8515625$; $c_3=18.6875$.

In S208; chromatic calibration is performed.

In some embodiments of the present disclosure, after the second pixel values of the plurality of pixels included in the second video signal are subjected to the pre-order color processing (e.g., the steps of S201 to S207) in the above embodiments, a video signal is obtained, and the video signal includes pixel values of a plurality of pixels. The pixel values of the plurality of pixels are arranged in an array to obtain a third image matrix; the pixel value includes a first color sub-pixel value, a second color sub-pixel value and a third color sub-pixel value.

For example, in a case where the color space of the second video signal is a certain color space; values of the first color sub-pixel value, the second color sub-pixel value, and the third color sub-pixel value may be consistent with color components of the corresponding color space. A corresponding relationship between the values of the first color sub-pixel value, the second color sub-pixel value, and the third color sub-pixel value and the three color components may be configured as needed, which is not limited here. For example, the color space of the second video signal is an RCB color space, and pixel values of a plurality of pixels included in each second image matrix in the second video signal are a plurality of groups of R, G and B components. A first color sub-pixel value, a second color sub-pixel value, and a third color sub-pixel value included in a pixel value of a single pixel are a single group of R, G and B components. For example, the first color sub-pixel value is the R component, the second color sub-pixel value is the G component; and the third color sub-pixel value is the B component. Of course, a corresponding relationship between the sub-pixel values and the color components is not limited thereto; for example, the first color sub-pixel value may also be the G component.

A value range of a pixel value of a pixel includes a value range of each sub-pixel value in the pixel value. Different sub-pixel values have their respective value ranges, and the value ranges of the different sub-pixel values may be the same or different. For example, the value ranges of the R component, the G component, and the B component may be the same. For example, the R, G and B components are each 8 bits, and the value ranges thereof are each 0 to 255.

For example, in a certain color space, each sub-pixel value is set to a random value within its value range, and sub-pixel values with random values are randomly combined into a plurality of pixel values; each of the plurality of pixel values represents a color, and a range formed by colors represented by the plurality of pixel values is a color gamut range. For example, if a color space is an RGB color space, and value ranges of R, G, and B components are each 0 to 255, then each color component has 256 values, and the color components with random values may represent 256×256×256=16,777,216 colors after being randomly combined; a range formed by these colors is a color gamut range, and a position of the color gamut range on a chromatic diagram is shown as a triangular region in FIG. 16.

Figure 16:
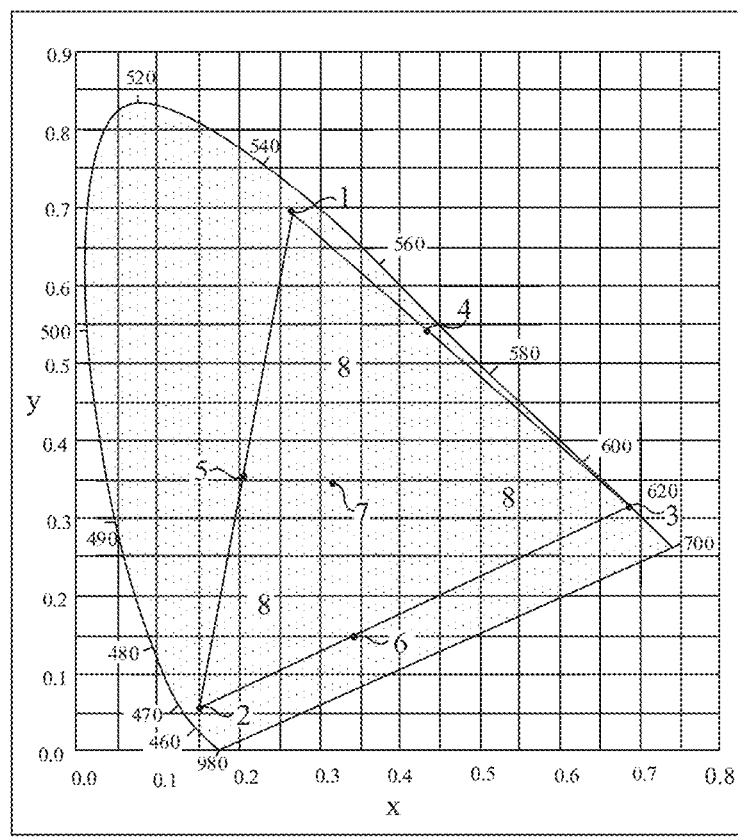
FIG. 16 is a diagram showing a color gamut range and color zones, in accordance with some embodiments of the present disclosure.

For example, a value range of a pixel value of a pixel is divided into a plurality of value intervals, and one value interval corresponds to one color zone. For example, a value range of a pixel value of a pixel is divided into a plurality of value intervals (e.g., eight value intervals), and each value interval is configured to define a value condition for each sub-pixel value. Referring to FIG. 16, each value interval is configured to define value conditions of the R component, the G component, and the B component, and the value range of the pixel value of the pixel may be divided into the following eight value intervals.

A first value interval corresponds to a region marked 3 in FIG. 16. In the first value interval, the first color sub-pixel value is greater than 0, the second color sub-pixel value is equal to 0, and the third color sub-pixel value is equal to 0; for example, R>0, G=0, and B=0.

A second value interval corresponds to a region marked 1 in FIG. 16. In the second value interval, the first color sub-pixel value is equal to 0, the second color sub-pixel value is greater than 0, and the third color sub-pixel value is equal to 0; for example, R=0, G>0, and B=0.

A third value interval corresponds to a region marked 2 in FIG. 16. In the third value interval, the first color sub-pixel value is equal to 0, the second color sub-pixel value is equal to 0, and the third color sub-pixel value is greater than 0; for example, R=0, G=0, and B>0.

A fourth value interval corresponds to a region marked 4 in FIG. 16. In the fourth value interval, the first color sub-pixel value and the second color sub-pixel value are equal and are greater than 0, and the third color sub-pixel value is equal to 0; for example, R=G>0, and B=0.

A fifth value interval corresponds to a region marked 5 in FIG. 16. In the fifth value interval, the first color sub-pixel value is equal to 0, and the second color sub-pixel value and the third color sub-pixel value are equal and are greater than 0; for example, R=0, and G=B>0.

A sixth value interval corresponds to a region marked 6 in FIG. 16. In the sixth value interval, the first color sub-pixel value and the third color sub-pixel value are equal and are greater than 0, and the second color sub-pixel value is equal to 0; for example, R=B>0, and G=0.

A seventh value interval corresponds to a region marked 7 in FIG. 16. In the seventh value interval, the first color sub-pixel value, the second color sub-pixel value and the third color sub-pixel value are all equal and are all greater than 0; for example, R=G=B>0.

An eighth value interval corresponds to a region marked 8 in FIG. 16. In the eighth value interval, the first color sub-pixel value, the second color sub-pixel value and the third color sub-pixel value are all unequal and are all greater than 0; for example, R>0, G>0, B>0, and R≠B≠G.

For example, in the first value interval to the seventh value interval, there is a representative value in each value interval. For example:

the first value interval includes a first value Q1; a first color sub-pixel value of the first value Q1 is a maximum value, a second color sub-pixel value of the first value Q1 is equal to 0, and a third color sub-pixel value of the first value Q1 is equal to 0; for example, R=255, G=0, and B=0;

the second value interval includes a second value Q2; a first color sub-pixel value of the second value Q2 is equal to 0, a second color sub-pixel value of the second value Q2 is the maximum value, and a third color sub-pixel value of the second value Q2 is equal to 0; for example; R=0, G=255, and B=0;

the third value interval includes a third value Q3; a first color sub-pixel value of the third value Q3 is equal to 0, a second color sub-pixel value of the third value Q3 is equal to 0; and a third color sub-pixel value of the third value Q3 is the maximum value; for example, R=0; G=0, and B=255;

the fourth value interval includes a fourth value Q4; a third color sub-pixel value of the fourth value Q4 is equal to 0; and a first color sub-pixel value of the fourth value Q4 and a second color sub-pixel value of the fourth value Q4 are equal and are each the maximum value; for example; R=255; G=255, and B=0;

the fifth value interval includes a fifth value Q5; a first color sub-pixel value of the fifth value Q5 is equal to 0, and a second color sub-pixel value of the fifth value Q5 and a third color sub-pixel value of the fifth value Q5 are equal and are each the maximum value; for example; R=0, G=255, and B=255;

the sixth value interval includes a sixth value Q6; a first color sub-pixel value and a third color sub-pixel value of the sixth value Q6 are equal and are each the maximum value, and a second color sub-pixel value of the sixth value Q6 is equal to 0; for example, R=255, G=0, and B=255;

the seventh value interval includes a seventh value Q7; a first color sub-pixel value, a second color sub-pixel value and a third color sub-pixel value of the seventh value Q7 are all equal and are each the maximum value; for example, R=255, G=255, and B=255.

For example, the video processing method further includes: obtaining a video signal, performing chromatic calibration on the obtained video signal, and outputting the video signal that has undergone the chromatic calibration. A color gamut range of the video signal includes at least two color zones, and each color zone corresponds to a set of correction data. Performing the chromatic calibration on the video signal includes correcting image data in a color zone in the video signal using a set of correction data corresponding to the color zone. The color gamut range of the video signal includes at least eight color zones; and value ranges of pixel values of pixels corresponding to the eight color zones are as described above.

For example, a pixel value of a pixel is corrected using a set of correction data corresponding to a value interval in which the pixel value is located, so as to obtain a corrected pixel value of the pixel. For example, in a case where the color gamut range includes eight color zones, that is, the value range of the pixel value includes eight value intervals, pixel values in the eight value intervals may be corrected respectively using eight sets of correction data, so as to obtain the corrected pixel value of the pixel.

For example, each set of correction data is obtained through a reference matrix A. For example, the reference matrix A may be directly used as the set of correction data, or the reference matrix A may be adjusted to obtain the set of correction data.

Figure 18:
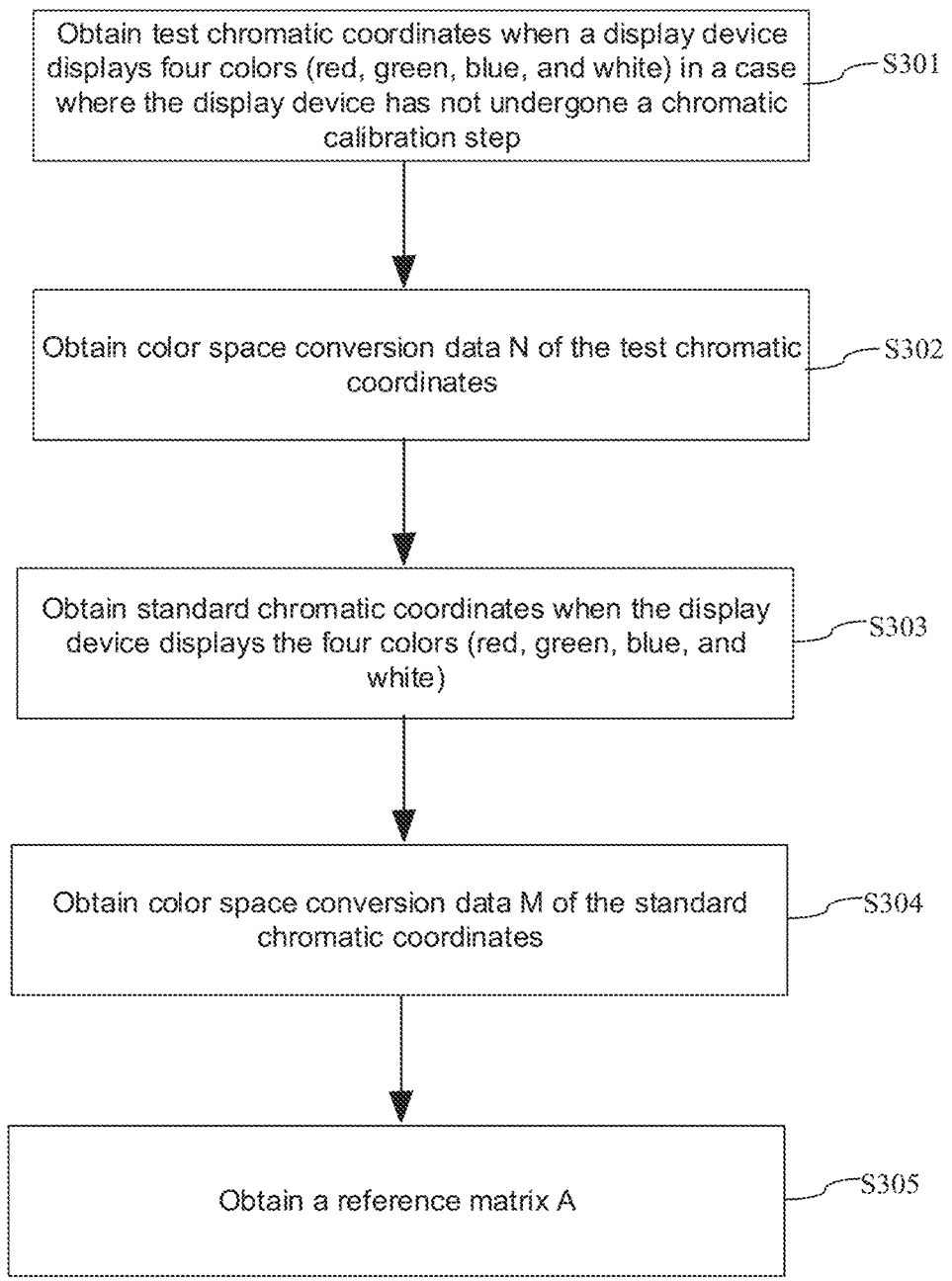
FIG. 18 is a flow diagram of a process of chromatic calibration, in accordance with some embodiments of the present disclosure.

For example, referring to FIG. 18, the reference matrix A may be obtained by the following method.

In S301, test chromatic coordinates when the display device displays four colors (red, green, blue, and white) in a case where the display device has not undergone the chromatic calibration are obtained.

For example, each group of reference matrices A in the display device may be set as an initial reference matrix A0, and A0 is an identity matrix. Since the identity matrix does not change a matrix by which it is multiplied, in this case, the display device has not undergone the chromatic calibration.

Image data input to the display device is adjusted so that the display device displays a red image, and after the image displayed by the display device is stabilized, test chromatic coordinates when the display device displays a red color are measured. By changing the input image data and repeating the above operations, test chromatic coordinates when the display device displays green, blue and white colors may also be measured.

For example, the image data input to the display device is adjusted, so that a pixel value (R, G, B) of each pixel in an image matrix before correction by the video processing device 100 in the display device is a first value Q1 (255, 0, 0). Since an identity matrix A0 is used as a reference matrix, a pixel value (R, G, B) of each pixel after the correction is still the first value Q1. That is, the first value Q1 has not been corrected. The display device may continue to perform step S209 and subsequent steps, until all pixels in the display panel are driven to display a red color, After the red image displayed by the display device is stabilized, an optical colorimeter is aimed at a center of a screen, and chromatic coordinates x, y and z of an XYZ color space actually displayed by the display panel are measured. That is, the chromatic coordinates x, y, and z of the XYZ color space when the display device displays a red color. This may also be expressed as: in a case where a pixel value of a pixel (e.g., each pixel) in the third image matrix is the first value, and a set of reference matrices corresponding to the first value interval are identity matrices, the chromatic coordinates x, y and z of the XYZ color space when the pixel displays a red color are measured. The pixel value (R, G, B) of each pixel in the image matrix before the correction is adjusted to the second value Q2 (0, 255, 0), the third value Q3 (0, 0, 255) and the seventh value Q7 (255, 255, 255) in sequence; each time the pixel value is adjusted, the above process of measuring the test chromatic coordinates is repeated, so as to obtain the data shown in Table 1 below

TABLE 1

| | Test chromatic coordinates | | | |
|---|---|---|---|---|
| | Q1 | Q2 | Q3 | Q7 |
| x | 0.6697 | 0.2582 | 0.1427 | 0.2602 |
| y | 0.3246 | 0.6662 | 0.0896 | 0.3109 |
| z | 0.0057 | 0.0755 | 0.7677 | 0.4290 |

A column where the first value Q1 is located in Table 1 shows the measured chromatic coordinates $x_1$, $y_1$ and $z_1$ of the XYZ color space actually displayed by the display panel in a case where the chromatic coordinates of the pixel values of all the pixels are the first value Q1. The meanings of other columns in Table 1 are similar to the above explanation, and details are not repeated here.

In S302, color space conversion data N of the test chromatic coordinates is obtained.

For example, the optical colorimeter can only measure the chromatic coordinates x, y and z of the actually displayed XYZ color space, and cannot directly measure the actually displayed color components X, Y and Z of the XYZ color space. Therefore, there's a need to convert the actual color components of the RGB color space into the actual color components of the XYZ color space through the color space conversion data N (which may also be denoted as $N_{Panel}$).

For example, based on the actual color components of the RGB color space, the actual color components of the XYZ color space may be obtained by polynomial regression, and a conversion relationship may be as follows:

$$\begin{pmatrix} X \\ Y \\ Z \end{pmatrix}_{actual} = \begin{pmatrix} X_1 & X_2 & X_3 \\ Y_1 & Y_2 & Y_3 \\ Z_1 & Z_2 & Z_3 \end{pmatrix}_{actual} \times \begin{pmatrix} R \\ G \\ B \end{pmatrix}_{actual} ;$$

from $x_1 = \frac{X_1}{S_1}, y_1 = \frac{Y_1}{S_1}, z_1 = \frac{Z_1}{S_1}$, and $S_1 = X_1 + Y_1 - Z_1$ (the same applies to other values), it is obtained that $$\begin{pmatrix} X \\ Y \\ Z \end{pmatrix}_{actual} = \begin{pmatrix} X_1 & X_2 & X_3 \\ Y_1 & Y_2 & Y_3 \\ Z_1 & Z_2 & Z_3 \end{pmatrix}_{actual} \begin{pmatrix} S_1 & 0 & 0 \\ 0 & S_2 & 0 \\ 0 & 0 & S_3 \end{pmatrix}_{actual} \times \begin{pmatrix} R \\ G \\ B \end{pmatrix}_{actual} \text{ and}$$

$$N = \begin{pmatrix} x_1 & x_2 & x_3 \\ y_1 & y_2 & y_3 \\ z_1 & z_2 & z_3 \end{pmatrix}_{actual} \begin{pmatrix} S_1 & 0 & 0 \\ 0 & S_2 & 0 \\ 0 & 0 & S_3 \end{pmatrix}_{actual} ,$$

where $\begin{pmatrix} x_1 & x_2 & x_3 \\ y_1 & y_2 & y_3 \\ z_1 & z_2 & z_3 \end{pmatrix}_{actual} = \begin{pmatrix} 0.6679 & 0.2582 & 0.1427 \\ 0.3246 & 0.6662 & 0.0896 \\ 0.0057 & 0.0755 & 0.7677 \end{pmatrix}$.

This conversion relationship also applies to the seventh value Q7. It may be seen from the RGB chromatic coordinates of the seventh value that, in a case where the chromatic coordinates of the pixel value are the seventh value Q7, a color displayed by the display panel driven by the pixel value is white, and XYZ color space chromatic coordinates $x_w$, $y_w$ and $z_w$ of corresponding to white satisfy the following relationship:

$$\begin{pmatrix} X_W \\ Y_W \\ Z_W \end{pmatrix}_{actual} =$$

$$\begin{pmatrix} x_1 & x_2 & x_3 \\ y_1 & y_2 & y_3 \\ z_1 & z_2 & z_3 \end{pmatrix}_{actual} \begin{pmatrix} S_1 & 0 & 0 \\ 0 & S_2 & 0 \\ 0 & 0 & S_3 \end{pmatrix}_{actual} \times \begin{pmatrix} 1 \\ 1 \\ 1 \end{pmatrix} = \begin{pmatrix} x_1 & x_2 & x_3 \\ y_1 & y_2 & y_3 \\ z_1 & z_2 & z_3 \end{pmatrix}_{actual} \begin{pmatrix} S_1 \\ S_2 \\ S_3 \end{pmatrix}_{actual} ,$$

$$\begin{pmatrix} S_1 \\ S_2 \\ S_3 \end{pmatrix}_{actual} = \begin{pmatrix} x_1 & x_2 & x_3 \\ y_1 & y_2 & y_3 \\ z_1 & z_2 & z_3 \end{pmatrix}_{actual}^{-1} \begin{pmatrix} X_W \\ Y_W \\ Z_W \end{pmatrix}_{actual} ,$$

$$x_w = \frac{X_w}{S_w}, y_w = \frac{Y_w}{S_w}, \text{ and } z_w = \frac{Z_w}{S_w};$$

if $Y_w = 1$, then $y_w = \frac{1}{S_w}$, $S_w = \frac{1}{y_w}$, $$\begin{pmatrix} X_W \\ Y_W \\ Z_W \end{pmatrix}_{actual} = \begin{pmatrix} \frac{x_w}{y_w} \\ 1 \\ \frac{z_w}{y_w} \end{pmatrix}_{actual} = \begin{pmatrix} 0.836925056 \\ 1 \\ 1.379864908 \end{pmatrix}, \text{ and}$$

$$\begin{pmatrix} S_1 \\ S_2 \\ S_3 \end{pmatrix}_{actual} = \begin{pmatrix} x_1 & x_2 & x_3 \\ y_1 & y_2 & y_3 \\ z_1 & z_2 & z_3 \end{pmatrix}_{actual}^{-1} \begin{pmatrix} \frac{x_w}{y_w} \\ 1 \\ \frac{z_w}{y_w} \end{pmatrix}_{actual} ;$$

if the above data is substituted into the formula, it can be obtained that:

$$\begin{pmatrix} S_1 \\ S_2 \\ S_3 \end{pmatrix}_{actual} =$$

$$\begin{pmatrix} 1.823735 & -0.677369 & -0.259939 \\ -0.898664 & 1.854952 & -0.049452 \\ 0.074839 & -0.177397 & 1.309386 \end{pmatrix} \begin{pmatrix} 0.644361 \\ 1.191948 \\ 1.203205 \end{pmatrix} = \begin{pmatrix} 0.490281 \\ 1.0346 \\ 1.692013 \end{pmatrix} ; \text{ and}$$

$$\text{then } N = \begin{pmatrix} x_1 & x_2 & x_3 \\ y_1 & y_2 & y_3 \\ z_1 & z_2 & z_3 \end{pmatrix}_{actual} \begin{pmatrix} S_1 & 0 & 0 \\ 0 & S_2 & 0 \\ 0 & 0 & S_3 \end{pmatrix}_{actual} = \begin{pmatrix} 0.328 & 0.267 & 0.241 \\ 0.159 & 0.689 & 0.152 \\ 0.003 & 0.078 & 1.299 \end{pmatrix}.$$

In S303, standard chromatic coordinates when the display device displays the four colors (red, green, blue, and white) are obtained.

For example, according to the high-definition digital video standard selected by the user, the first value Q1, the second value Q2, the third value Q3 and the seventh value Q7 represented by RGB color space color components are converted into XYZ color space chromatic coordinates. The user may choose a high-definition digital video standard in the OSD menu at will. Since color gamuts and conversion relationships of different standards are different, accordingly, in a case where high-definition digital video standards selected by the user are different, the obtained color space conversion data M (which may also be denoted as $M_{standard}$) is different, and the finally obtained conversion data of each value interval is also different. For example, according to BT.709, the RGB color space color components of the first value Q1, the second value Q2, the third value Q3 and the seventh value Q7 are converted into the XYZ color space chromatic coordinates, and conversion results shown in the following Table 2 may be obtained.

TABLE 2

| | Standard chromatic coordinates | | | |
|---|---|---|---|---|
| | Q1 | Q2 | Q3 | Q7 |
| x | 0.64 | 0.3 | 0.15 | 0.3127 |
| y | 0.33 | 0.6 | 0.06 | 0.329 |
| z | 0.03 | 0.1 | 0.79 | 0.3583 |

A column where the first value Q1 is located in Table 2 shows the chromatic coordinates x, y and z of the standard XYZ color space obtained according to the BT.709 standard conversion relationship in a case where the color components of the pixel values of all pixels are the first value Q1. The meanings of other columns in Table 2 are similar to the above explanation, and details are not repeated here.

In S304, color space conversion data M of the standard chromatic coordinates is obtained.

Similar to the obtaining of the color space conversion data N of the test chromatic coordinates, the obtaining of the color space conversion data M of the standard chromatic coordinates satisfies the following relationship:

$$\begin{pmatrix} X \\ Y \\ Z \end{pmatrix}_{standard} = \begin{pmatrix} X_1 & X_2 & X_3 \\ Y_1 & Y_2 & Y_3 \\ Z_1 & Z_2 & Z_3 \end{pmatrix}_{standard} \times \begin{pmatrix} R \\ G \\ B \end{pmatrix}_{standard},$$

$$\begin{pmatrix} X \\ Y \\ Z \end{pmatrix}_{standard} = \begin{pmatrix} x_1 & x_2 & x_3 \\ y_1 & y_2 & y_3 \\ z_1 & z_2 & z_3 \end{pmatrix}_{standard} \begin{pmatrix} S_1 & 0 & 0 \\ 0 & S_2 & 0 \\ 0 & 0 & S_3 \end{pmatrix}_{standard} \times \begin{pmatrix} R \\ G \\ B \end{pmatrix}_{standard},$$

$$M = \begin{pmatrix} x_1 & x_2 & x_3 \\ y_1 & y_2 & y_3 \\ z_1 & z_2 & z_3 \end{pmatrix}_{standard} \begin{pmatrix} S_1 & 0 & 0 \\ 0 & S_2 & 0 \\ 0 & 0 & S_3 \end{pmatrix}_{standard}, \text{ and}$$

$$\begin{pmatrix} S_1 \\ S_2 \\ S_3 \end{pmatrix}_{standard} = \begin{pmatrix} x_1 & x_2 & x_3 \\ y_1 & y_2 & y_3 \\ z_1 & z_2 & z_3 \end{pmatrix}_{standard}^{-1} \begin{pmatrix} x_w \\ y_w \\ 1 \\ \frac{z_w}{y_w} \end{pmatrix}_{standard};$$

if the above data is substituted into the formula, it can be obtained that:

$$\begin{pmatrix} S_1 \\ S_2 \\ S_3 \end{pmatrix}_{standard} = \begin{pmatrix} 2.088 & -0.991 & -0.321 \\ -1.155 & 2.236 & 0.050 \\ 0.003 & 0.078 & 1.299 \end{pmatrix} \begin{pmatrix} 0.950455927 \\ 1 \\ 1.089057751 \end{pmatrix} = \begin{pmatrix} 0.644361 \\ 1.191948 \\ 1.203205 \end{pmatrix}, \text{ and}$$

then M =

$$\begin{pmatrix} x_1 & x_2 & x_3 \\ y_1 & y_2 & y_3 \\ z_1 & z_2 & z_3 \end{pmatrix}_{standard} \begin{pmatrix} S_1 & 0 & 0 \\ 0 & S_2 & 0 \\ 0 & 0 & S_3 \end{pmatrix}_{standard} = \begin{pmatrix} 0.412 & 0.358 & 0.180 \\ 0.022 & 0.966 & -0.073 \\ 0.011 & 0.033 & 0.736 \end{pmatrix}$$

In S305, the reference matrix A is obtained.

For example, $A = N^{-1}M$; and if the above data is substituted into the formula, it can be obtained that:

$$A = N^{-1}M = \begin{pmatrix} 1.230 & 0.279 & 0.068 \\ 0.022 & 0.966 & -0.073 \\ 0.011 & 0.033 & 0.736 \end{pmatrix}.$$

For example, the at least one set of correction data is obtained through the following steps: initializing a set of correction data corresponding to a value interval into a reference matrix; correcting a representative value in the value interval using the set of correction data to obtain a corrected value; driving at least one pixel using the corrected value to obtain XYZ color space chromatic coordinates of a color presented by at least one pixel; obtaining a difference value between the XYZ color space chromatic coordinates of the color presented by the at least one pixel when driven by the corrected value and XYZ color space chromatic coordinates corresponding to another corrected value in a high-definition digital video standard; if an absolute value of the difference value is greater than a target threshold, adjusting the set of correction data, and returning to correcting the representative value in the value interval using the set of correction data to obtain the corrected value; and if the absolute value of the difference value is not greater than the target threshold, a latest set of correction data being used as the set of correction data corresponding to the value interval.

Considering a process of obtaining a set of correction data B of the first value interval as an example, the process of obtaining the set of correction data B by using the reference matrix A will be described in detail below.

First, the set of correction data B of the first value interval is initialized into the reference matrix A. That is, the reference matrix A is used as the set of correction data B of the first value interval.

The reference matrix A is used to correct the first value Q1, and it is obtained that $Q1^1 = A \times Q1$ The image data input to the display device is adjusted, so that the pixel value (R, G, B) of each pixel in the image matrix before the correction by the video processing device 100 in the display device is the first value Q1 (255, 0, 0); then, after the correction using the reference matrix A, the pixel value of each pixel is corrected to a first value $Q1^1$. The display device may continue to perform step S209 and subsequent steps on the basis of the first value $Q1^1$, until the display panel is driven to display a red image (i.e., each pixel in the display panel displays a red color). After the red image displayed by the display device is stabilized, the optical colorimeter is aimed at the center of the screen, and XYZ color space chromatic coordinates $x_{correction}$, $y_{correction}$ and $z_{correction}$ of the red color displayed by the display panel when driven by the first value $Q1^1$ are measured; and a difference value between the $x_{correction}$, $y_{correction}$ and $z_{correction}$ and XYZ color space chromatic coordinates $x_{standard}$, $y_{standard}$ and $z_{standard}$ corresponding to the first value $Q1^1$ in the high-definition digital video standard is obtained.

It is determined whether an absolute value of the difference value is greater than the target threshold; if the absolute value of the difference value is greater than the target threshold, the set of correction data is adjusted, and the method returns to the step of correcting the representative value in the value interval using the set of correction data to obtain another corrected value; if the absolute value of the difference value is not greater than the target threshold, the latest set of correction data is used as the set of correction data corresponding to the value interval. The target threshold may be set according to actual needs, for example, may be set to 0.01, 0.005, or 0.003.

For example, the target threshold is 0.01, and the description that the absolute value of the difference value is greater than the target threshold includes $|x_{correction} - x_{standard}| > 0.01$ and $|y_{correction} - y_{standard}| > 0.01$. If the absolute value of the difference value is not greater than the target threshold, then the set of correction data B of the first value interval is the reference matrix A. By comparing only two chromatic coordinates, the steps of the chromatic calibration may be simplified.

For example, if the absolute value of the difference value is greater than the target threshold, the values in the reference matrix A are adjusted to obtain $A^1$, $A^1$ is used as a new set of correction data B of the first value interval; then, the first value Q1 is corrected again by using $A^1$, and it is obtained that $Q1^2 = A^1 \times Q1$. The display device may continue to perform step S209 and subsequent steps based on a first value $Q1^2$, until the display panel is driven to display a red image (i.e., each pixel in the display panel displays a red color). After the red image displayed by the display device is stabilized, the optical colorimeter is aimed at the center of the screen, and XYZ color space chromatic coordinates $x^1_{correction}$, $y^1_{correction}$ and $z^1_{correction}$ of the red color displayed by the display panel when driven by the first value $Q1^2$ are measured. Then, it is determined again whether the absolute value of the difference value is greater than the target threshold. The above processes are repeated until the absolute value of the difference value is not greater than the target threshold, in which case the set of correction data B of the first value interval is equal to $A^i_{(B=A^i)}$, where i is a positive integer.

The process of obtaining correction data of other value intervals is the same as the above process, and details are not repeated here.

For example, a set of correction data B of the eighth value interval is the reference matrix A. That is, the set of correction data B of the eighth value interval may be directly applied without adjusting the reference matrix A.

For example, a third pixel value is corrected by using a set of correction data corresponding to a value interval in which the pixel value is located to obtain a corresponding corrected pixel value, and a plurality of corrected pixel values are arranged in an array to obtain a fourth image matrix. It will be understood that values of the chromatic coordinates are all integers; therefore, the calculated coordinates may be rounded to integers. For example, if the pixel value is (121, 100, 150), it may be seen from the division of the value intervals that the pixel value falls within the eighth value interval, and the corresponding correction data B is the reference matrix A; the pixel value in the eighth value interval is corrected by using the reference matrix A, and the corrected pixel value is obtained as below:

$$A\begin{pmatrix}121\\100\\150\end{pmatrix} = \begin{pmatrix}1.230 & 0.279 & 0.068\\0.022 & 0.966 & -0.073\\0.011 & 0.033 & 0.736\end{pmatrix}\begin{pmatrix}121\\100\\150\end{pmatrix} \approx \begin{pmatrix}187\\88\\115\end{pmatrix}.$$

In some embodiments of the present disclosure, each value interval has a representative value. In a case where a pixel value of a pixel is a representative value of a value interval, chromatic coordinates of a color presented by the pixel when driven by a corrected representative value are $xy_{representive}$. In a case where a pixel value of a pixel is a non-representative value in the corrected value interval, chromatic coordinates of a color presented by the pixel driven by a corrected non-representative value are $xy_{non-representative}$. There are chromatic coordinates $xy_{standard}$ corresponding to the representative value in the value interval in the high-definition digital video standard. It will be understood that the $xy_{representative}$ of the corrected representative value is approximately equal to the $xy_{standard}$ of the corresponding high-definition digital video standard, and the $xy_{representative}$, of the corrected representative value is closer to the $xy_{standard}$ of the corresponding high-definition digital video standard than the $xy_{non-representative}$ of the corrected non-representative value. That is, an absolute value of a difference value between the $xy_{representative}$ of the corrected representative value and the $xy_{standard}$ of the corresponding high-definition digital video standard is less than an absolute value of a difference value between the $xy_{non-representative}$ of the corrected non-representative value and the $xy_{standard}$ of the corresponding high-definition digital video standard. For example, in the first value interval, in a case where a pixel value of a pixel is the first value Q1 (255, 0, 0), chromatic coordinates xy of a color presented by the pixel when the pixel is driven by the corrected first value are closer to chromatic coordinates xy corresponding to the first value in the high-definition digital video standard than when the pixel is driven by a pixel value that is a value in the first value interval other than the first value. The effect that may be achieved by related values in the second value interval to the seventh value interval is similar to that of the first value interval, and details are not repeated here.

For example, chromatic coordinates xy of a color presented by a pixel when the pixel is driven by the corrected representative value of each value interval are approximately equal to the chromatic coordinates xy corresponding to the representative value in the high-definition digital video standard. For example, in the case where the pixel value of the pixel is the first value Q1 (255, 0, 0), the chromatic coordinates xy of the color presented by the pixel when the pixel is driven by the first value are approximately equal to the chromatic coordinates xy corresponding to the first value in the high-definition digital video standard. The effect that may be achieved by the related values in the second value interval to the seventh value interval is similar to that of the first value interval, and details are not repeated here.

It will be understood that the value range of the pixel value of each pixel is divided into eight value intervals, and pixel values of different value intervals are corrected using different correction data. That is, for each high-definition digital video standard, the chromatic calibration may be realized by using only 8 sets of correction data. If the display device supports N high-definition digital video standards, the total number of sets of correction data required is only N×8. In this way, less content needs to be stored in the hardware and only a small amount of hardware resources are needed in a calibration process to achieve a good chromatic calibration effect. Therefore, the display quality may be improved, and the production cost may be better controlled.

For example, post-order color processing may also be performed on the video signal after the chromatic calibration. For example, the post-order color processing includes at least one of non-linear processing, gamma curve adjustment, and white balance processing. The video signal after the chromatic calibration is a sixth video signal, and the sixth video signal includes at least one fourth image matrix; each fourth image matrix includes corrected pixel values of the plurality of pixels.

In S209, non-linear processing is performed.

In some embodiments of the present disclosure, after the chromatic calibration is completed, in order to further adjust the gamma curve, there's a need to perform the non-linear processing (e.g., an opto-electronic transfer function (OETF) processing, also referred to as photoelectric conversion) first, and then restore the gamma curve into a corresponding non-linear curve. Similar to the color space conversion, different high-definition digital video standards adopt different photoelectric conversion functions. Correspondingly, in a case where the referenced high-definition digital video standards are different, the obtained OETF curves will also be different.

For example, the OSD menu provides a plurality of high-definition digital video standard options, such as BT.2020, BT.709, DCI-P3, and Rec.709. A high-definition digital video standard may be selected through the OSD menu, and the video processing device 100 converts an OETF curve of the video signal that has undergone the chromatic calibration to a new OETF curve corresponding to the selected standard through the non-linear processing. For example, the selected high-definition digital video standard is BT.709, and a corresponding photoelectric conversion function in the BT.709 standard is:

if $1 \geq L \geq 0.018$, $V=1.099L^{0.45}-0.099$; and
if $0.018 > L \geq 0$, $V=4.500L$.

Here, L is an image luminance, $0 \leq L \leq 1$; and V is a corresponding electrical signal.

In S210, gamma curve adjustment is performed.

The gamma curve is a power function mapping of a luminance change visually perceived by the human brain. A deviation of an actual gamma value may be adjusted by adjusting the gamma curve, so that the actual gamma value is as close as possible to a gamma value (which is 2.2) of an ideal gamma curve, and the display effect is improved. In some embodiments of the present disclosure, the video processing device 100 adjusts a gamma curve of a video signal that has undergone the chromatic calibration (e.g., a video signal that has undergone the non-linear processing). During adjustment of the gamma curve, based on a setup parameter γ, a gamma curve with a gamma value of (γ/a preset gamma value) may be superimposed onto a preset gamma curve, so as to obtain a new gamma curve. For example, a preset gamma curve formula is $Y=X^2$, a preset gamma value is 2, and a gamma value desired by the user is 2.2, then the user may adjust the setup parameter γ to 2.2 through the OSD menu, and a new gamma curve formula will be $$Y = (X^2)^{\frac{2.2}{2}} = X^{2.2}.$$

In S211, white balance processing is performed.

The white balance is an index that describes a precision of a white color that is generated by mixing the color components in the display device. For example, the video processing device 100 performs white balance processing on a plurality of corrected pixel values included in at least one fourth image matrix (e.g., may be obtained after S210) in a video signal that has undergone the chromatic calibration (e.g., a video signal that has undergone the gamma curve adjustment), so as to obtain fourth pixel values of the plurality of pixels, and the fourth pixel values are arranged in an array to obtain a fifth image matrix. During the white balance processing, the color components R, G and B may be adjusted based on a setup parameter n, so as to output a new set of color components R', G' and B'. A value range of the setup parameter η is 0 to 1, and the user may adjust the setup parameter η through the OSD menu. The color components R, G and B of each fourth pixel value may be converted to R', G' and B' with reference to the following conditions:

$$R' = \begin{cases} 0.5 \times R + \text{Gain}_R \times R & \text{if } (0 \leq \text{Gain}_R < 0.5) \\ 2 \times \text{Gain}_R \times R & \text{if } (0.5 \leq \text{Gain}_R < 1) \end{cases}$$

-continued $$G' = \begin{cases} 0.5 \times G + \text{Gain}_G \times G & \text{if } (0 \leq \text{Gain}_G < 0.5) \\ 2 \times \text{Gain}_G \times G & \text{if } (0.5 \leq \text{Gain}_G < 1) \end{cases}$$

$$B' = \begin{cases} 0.5 \times B + \text{Gain}_B \times B & \text{if } (0 \leq \text{Gain}_B < 0.5) \\ 2 \times \text{Gain}_B \times B & \text{if } (0.5 \leq \text{Gain}_B < 1) \end{cases}.$$

In S104, an OSD trigger command is received, and in response to the OSD trigger command, OSD information is superimposed onto the video signal that has undergone the chromatic calibration.

S104 includes: in response to the OSD trigger command, superimposing the OSD information onto the video signal that has undergone at least one step in the color processing. In some embodiments, the OSD information is superimposed onto the video signal that has undergone the chromatic calibration in response to the OSD trigger command; for example, the OSD information is superimposed onto at least one fifth image matrix (e.g., a plurality of fifth image matrices), so as to obtain at least one sixth image matrix (e.g., a plurality of sixth image matrices).

In some embodiments of the present disclosure, the user may trigger an OSD function of the display device through a button provided on the DP. After receiving the OSD trigger command, the display device superimposes the OSD information onto the plurality of fifth image matrices to obtain the plurality of sixth image matrices. In this way, an OSD menu pattern will be superimposed onto a display image of the DP, so that the user may adjust relevant display parameters according to the information displayed in the OSD menu. It will be understood that, if the user adjusts the OSD parameters in a sixth image matrix of a current frame, a result of the parameter adjustment will be reflected in a sixth image matrix of a next frame. For example, if the user wishes to adjust a white balance value to 0.6, and the user has inputted a new white balance value in the OSD menu in the current frame, then the white balance value will be adjusted to 0.6 in the sixth image matrix of the next frame to be displayed.

In S105, the video signal superimposed with the OSD information is output.

For example, S105 includes: outputting the sixth image matrix to perform image display. The sixth image matrix processed by the video processing device 100 is output to the display module 200, and the display module 200 is configured to display an image according to the sixth image matrix.

In some embodiments of the present disclosure, the video processing method further includes: after step S1021 and before step S103, performing image segmentation. Correspondingly, the video processing method further includes: after S104, performing image merging.

Performing the image segmentation includes: dividing the obtained image matrix into a plurality parts to obtain a plurality of image sub-matrices.

Figure 21:
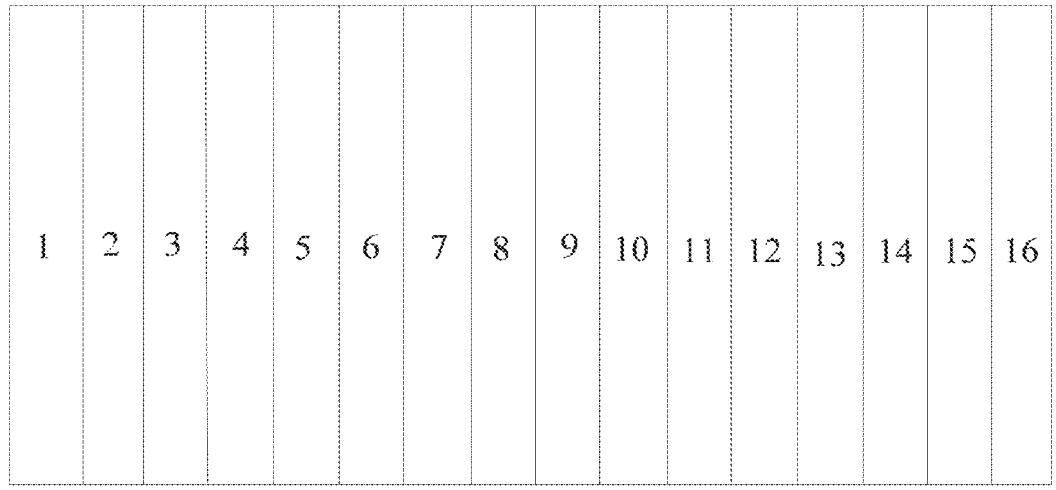
FIG. 21 is a schematic diagram of image sub-matrices after an image segmentation, in accordance with some embodiments of the present disclosure.
Figure 22:
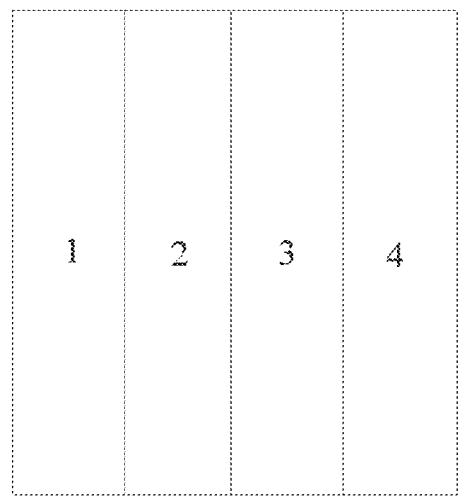
FIG. 22 is schematic diagram of image sub-matrices after an image segmentation, in accordance with some other embodiments of the present disclosure.

For example, the above steps will be described in detail by taking an example in which image matrix segmentation is performed after the pixel rearrangement of step S1021. For example, referring to FIG. 21, in a case where the image resolution of the first video signal is 8 k, an image matrix with a resolution of 7680×4320 is divided into 16 image sub-matrices, and a resolution of each image sub-matrix is 480×4320. For another example, referring to FIG. 22, in a case where the image resolution of the first video signal is 4 k, the seventh image matrix with a resolution of 3840×2160 is divided into four image sub-matrices, and a resolution of each sub-image matrix is 960×2160.

The image matrix is divided into a plurality of parts through the image segmentation, and the subsequent color processing of S103 is performed on a plurality of image matrices simultaneously, which may effectively shorten the time required for the color processing and improve the video processing efficiency.

For example, performing the image merging includes: merging the plurality of sub-image matrices obtained after the segmentation into an image matrix. For example, 16 image sub-matrices with a resolution of 480×4320 obtained after the segmentation are merged into a single image matrix with a resolution of 7680×4320, and four image sub-matrices with a resolution of 960×2160 obtained after the segmentation are merged into a single image matrix with a resolution of 3840×2160.

In some embodiments of the present disclosure, the video processing device may be divided into functional modules according to the method embodiments. For example, the video processing device may be divided into different functional modules corresponding to different functions: or two or more functions may be integrated into a single processing module. The modules may be implemented in the form of hardware or software functional modules. It will be noted that, the division of modules in the embodiments of the present disclosure is schematic, and is only a division according to logical functions, and there may be other division manners in actual implementation.

Figure 19:
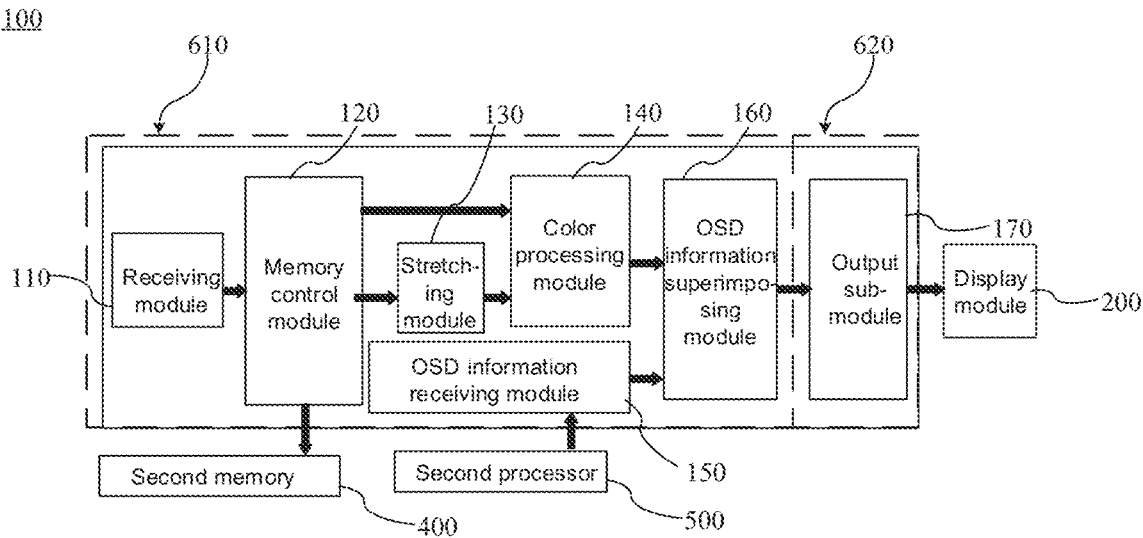
FIG. 19 is a structural diagram of modules of a video processing device, in accordance with some embodiments of the present disclosure.

Some embodiments of the present disclosure provide a video processing device 100. Referring to FIG. 19, the video processing device 100 includes a processing module 610 and an output module 620.

The processing module 610 is configured to obtain a video signal. A color gamut range of the video signal includes at least two color zones, and each color zone corresponds to a set of correction data.

The processing module 610 is further configured to perform chromatic calibration on the video signal including correcting image data in a color zone in the video signal using a set of correction data corresponding to the color zone.

The output module 620 is configured to output the video signal that has undergone the chromatic calibration.

For example, the processing module 610 is configured to perform one or more of steps S101 to S104; and the output module 620 is configured to perform step S105.

In some embodiments of the present disclosure, referring to FIG. 19, the video processing device 100 includes; a receiving module 110, a memory control module 120, a stretching module 130, a color processing module 140, an OSD information receiving module 150, an OSD information superimposing module 160, and an output sub-module 170.

Figure 20:
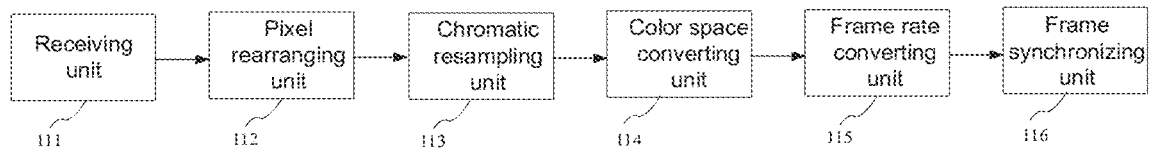
FIG. 20 is a structural diagram of a receiving module, in accordance with some embodiments of the present disclosure.

For example, the receiving module 110 receives a first video signal and converts the first video signal into a second video signal having a first preset video format. Referring to FIG. 20, the receiving module 110 may include: a receiving unit 111, a pixel rearranging unit 112, a chromatic resampling unit 113, a color space converting unit 114, a frame rate converting unit 115, and a frame synchronizing unit 116.

The receiving unit 111 may execute S101 in the steps of the video processing method. The receiving unit 111 is configured to receive a first video signal from an external device (e.g., a camera). The first video signal includes at least one video sub-signal (e.g., one or more video sub-signals) of, and each video sub-signal includes first pixel values of a plurality of pixels. A resolution of the first video signal is not limited. For example, the first video signal may be a video signal with a resolution of 4K, or a video signal with a resolution of 8K, or may be other high-resolution video signals.

The pixel rearrangement unit 112 may perform S1021 in the steps of the video processing method. That is, the pixel rearrangement unit 110 may perform pixel rearrangement on a plurality of first pixel values in the plurality of video sub-signals in the first video signal, so as to obtain a third video signal including a plurality of image matrices. For example, a video resolution of the first preset video format is a first resolution, and in a case where the resolution of the first video signal is less than the first resolution, the resolution of the first video signal is a second resolution. The pixel rearrangement unit 110 performs the pixel rearrangement on the plurality of first pixel values in the plurality of video sub-signals in the first video signal, and converts the first video signal into a fifth video signal having a plurality of first image matrices. The number of columns and the number of rows of each fifth image matrix are respectively equal to a row resolution and a column resolution of the second resolution. It may also be said that a resolution of each fifth image matrix is the second resolution, or, the resolution of the video signal obtained after the conversion is the second resolution.

For example, the chromatic resampling unit 113 and the color space converting unit 114 perform S1022 in the steps of the video processing method, so as to unify a plurality of color formats of the received first video signal and convert the plurality of color formats into a preset color format of the first preset video format. For example, the chromatic resampling unit 113 may convert a color format of the third video signal having a color space same as the color space of the first preset video format and a color depth different from the color depth of the first preset video format into a color format of the first preset video format for unification. The color space conversion unit 114 may convert the color format of the third video signal having a color space different from the color space of the first preset video format into the color format of the first preset video format for unification. For example, in a case where the resolution of the first video signal is less than the first resolution, the processing process of the first video signal by the chromatic resampling unit 113 and the color space conversion unit 114 is similar to the above process, and details will not be repeated here.

For example, the frame rate conversion unit 115 may perform S1023 in the steps of the video processing method. In a case where a frame rate of the third video signal is greater than a frame rate of the first preset video format, frame(s) will be discarded; and in a case where the frame rate of the third video signal is less than the frame rate of the first preset video format, frame(s) will be interpolated. In this way, frame rate conversion is performed on the third video signal, so that the frame rate of the third video signal is the same as the frame rate of the first preset video format. If the frame rate of the third video signal is the same as the frame rate of the first preset video format, the frame rate converting unit 115 may still process the third video signal, only that the frame rate of the third video signal will not be changed as a result. Of course, the frame rate conversion unit 115 may also not process the third video signal. For example, in a case where the resolution of the first video signal is less than the first resolution, the processing process of the first video signal by the frame rate converting unit 115 is similar to the above process, and details will not be repeated here.

For example, the frame synchronization unit 116 may perform S1024 in the steps of the video processing method, and perform frame synchronization processing on each frame of image in the third video signal, so that each frame of image in the third video signal is output according to a respective display timestamp of the frame of image. After being processed by the above units, the first video signal is converted into a second video signal having the first preset video format. The second video signal includes at least one second image matrix, and each second image matrix includes second pixel values of the plurality of pixels. For example, in a case where the resolution of the first video signal is less than the first resolution, the processing process of the first video signal by the frame synchronization unit 116 is similar to the above process, and details will not be repeated here. After being processed by the above units, the first video signal is converted into a fourth video signal having a second preset video format.

For example, in the video processing device 100, the stretching module 130 adjusts a resolution of a fourth video signal to obtain the second video signal having the first preset video format.

If the resolution of the fourth video signal is the same as the resolution of the first preset video format, the stretching module 130 may still process the fourth video signal, only that the resolution of the fourth video signal will not be changed as a result. Of course, the stretching module 130 may also not process the fourth video signal. For example, in a case where the resolution of the first video signal is less than the first resolution, the processing process of the first video signal by the frame rate converting unit 115 is similar to the above process. For example, a resolution of a video format of the fourth video signal is 4K, the resolution of the first preset video format is 8K, and other video formats of the fourth video signal are the same as the first preset video format. In this case, the stretching module 130 may stretch the resolution of the fourth video signal by using a nearest neighbor convolution, bilinear convolution, bicubic convolution or other methods. After the processing of the stretching module 130, the resolution of the fourth video signal reaches 8K, and the fourth video signal is converted into the second video signal having the first preset video format.

For example, the memory control module 120 may control the access to each memory according to a certain timing rule, so that each unit that needs to access a memory can use data resource stored on the memory according to each units requirement on the stored content. For example, during the frame rate conversion, the second memory 400 implements data writing and reading according to the control of the memory control module 120, thereby realizing the frame rate conversion.

For example, the color processing module 140 may perform any one of S201 to S207 included in step S103 of the video processing method. Correspondingly, the color processing module 140 performs at least one of hue processing, saturation processing, contrast processing, color space conversion, brightness processing, black balance processing, and linear processing on a plurality of second pixel values in the first image matrix, so as to obtain a third image matrix including pixel values of the plurality of pixels. The color processing module 140 may also perform S208 included in step S103 of the video processing method, so as to divide a value range of a pixel value of a pixel into a plurality of value intervals, each value interval corresponding to a set of correction data; and correct the pixel value using a set of correction data corresponding to a value interval in which the pixel value of the pixel is located, and obtain a corrected pixel value of the pixel, so as to obtain a fourth image matrix including a plurality of corrected pixel values. The color processing module 140 may also perform any one of S209 to S211 included in step S103 in the video processing method. Correspondingly, the color processing module 140 performs at least one of non-linear processing, gamma curve adjustment, and white balance processing on the plurality of corrected pixel values in the fourth image matrix, so as to obtain a fifth image matrix including fourth pixel values of the plurality of pixels. During the processing process of each processing step, a latest value of a corresponding parameter is adopted, and the latest value refers to a latest value of the parameter in the processing step at the time when the processing step is performed.

For example, the video processing device 100 further includes an OSD information receiving module 150 and an OSD information superimposing module 160 for performing step S104 of the video processing method. The OSD information receiving module is configured to receive OSD trigger command from a second processor 500, and the OSD information superimposing module 160 is configured to superimpose OSD menu information onto a video signal that has undergone color processing according to the OSD trigger command.

For example, the video processing device 100 further includes an output module 170, and the output module 170 may perform step S105 of the video processing method, so as to output the video signal processed by the OSD information superimposing module 160 to the display module 200.

For example, the video processing device 100 may further include a clock module, a reset module, an audio analysis module and a backlight control module. The clock module may be used to generate clock signals required by a plurality of clock domains. The reset module may generate reset signals, so that various kinds of reset such as hard reset, logical reset, and soft reset may be implemented in the video processing device 100. The audio analysis module may analyze the received video signal to obtain an audio signal, and output the obtained audio signal. The backlight control module may adjust a display brightness of the display device to realize local dimming.

For example, referring to FIG. 19, the processing module 610 may be integrated by the receiving module 110, the memory control module 120, the stretching module 130, the color processing module 140, the OSD information receiving module 150, the OSD information superimposing module 160, etc., and the output module 620 may include the output sub-module 170, which is not limited here.

It will be noted that, for the sake of clarity and conciseness, the embodiments of the present disclosure do not enumerate all constituent modules of the video processing device 100. In order to realize required functions of the video processing device 100, those skilled in the art may provide or set other unshown constituent modules according to specific needs, which are not limited in the embodiments of the present disclosure.

Some embodiments of the present disclosure provide a computer-readable storage medium (e.g., a non-transitory computer-readable storage medium). The computer-readable storage medium has stored thereon computer program instructions that, when run on a processor, cause the processor to perform one or more steps in the video processing method as described in any of the above embodiments.

For example, the computer-readable storage medium includes, but is not limited to, a magnetic storage device (e.g., a hard disk, a floppy disk or a magnetic tape), an optical disk (e.g., a compact disk (CD), or a digital versatile disk (DVD)), a smart card, and a flash memory device (e.g., an erasable programmable read-only memory (EPROM), a card, a stick or a key driver). Various computer-readable storage media described in the present disclosure may represent one or more devices and/or other machine-readable storage medium for storing information. The term "computer-readable storage medium" may include, but is not limited to, wireless channels and various other media capable of storing, containing and/or carrying instructions and/or data.

Some embodiments of the present disclosure further provide a computer program product. The computer program product includes computer program instructions that, when executed on a computer, cause the computer to perform one or more steps in the video processing method as described in the above embodiments.

Beneficial effects of the computer-readable storage medium, the computer program product and the computer program are the same as the beneficial effects of the video processing method as described in the above embodiments, and details will not be repeated here.

Some embodiments of the present disclosure further provide a computer program. When executed on a computer, the computer program causes the computer to perform one or more steps in the video processing method as described in the above embodiments.

Beneficial effects of the computer-readable storage medium, the computer program product and the computer program are the same as the beneficial effects of the video processing method as described in the above embodiments, and details will not be repeated here.

The foregoing descriptions are merely specific implementations of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A video processing method, comprising:
obtaining a video signal, a color gamut range of the video signal including at least two color zones, each of the at least two color zones corresponding to a set of correction data;
performing chromatic calibration on the video signal, including correcting image data of the video signal in a color zone of the at least two color zones using a set of correction data corresponding to the color zone; and
outputting the video signal that has undergone the chromatic calibration;
wherein each set of correction data in sets of correction data corresponding to the at least two color zones is obtained through a reference matrix;
the video signal includes pixel values of a plurality of pixels; a value range of a pixel value of a pixel in the plurality of pixels is divided into a plurality of value intervals, and a value interval of the plurality of value intervals corresponds to one of the color zones; and
at least one set of correction data is obtained by performing following steps:
initializing a set of correction data corresponding to the value interval into the reference matrix;
correcting a representative value in the value interval using the set of correction data corresponding to the value interval to obtain a corrected value;
driving at least one pixel using the corrected value to obtain XYZ color space chromatic coordinates of a color presented by the at least one pixel;
obtaining a difference value between the XYZ color space chromatic coordinates of the color presented by the at least one pixel when driven by the corrected value and XYZ color space chromatic coordinates corresponding to the corrected value in a high-definition digital video standard;
if an absolute value of the difference value is greater than a target threshold, adjusting the set of correction data corresponding to the value interval, and returning to a step of correcting the representative value in the value interval using the set of correction data corresponding to the value interval to obtain another corrected value; and
if the absolute value of the difference value is not greater than the target threshold, a latest set of correction data being used as the set of correction data corresponding to the value interval.

2. The video processing method according to claim 1, wherein
correcting the image data of the video signal in the color zone using the set of correction data corresponding to the color zone includes: correcting a pixel value of a pixel in a value interval corresponding to the color zone using a set of correction data corresponding to the value interval in which the pixel value is located, so as to obtain a corrected pixel value of the pixel.

3. The video processing method according to claim 1, wherein the reference matrix A satisfies following conditions:

$$A = N_{Panel}^{-1} M_{standard}, \text{ where}$$

$$N_{Panel} = \begin{pmatrix} x_1 & x_2 & x_3 \\ y_1 & y_2 & y_3 \\ z_1 & z_2 & z_3 \end{pmatrix} \begin{pmatrix} S_1 & 0 & 0 \\ 0 & S_2 & 0 \\ 0 & 0 & S_3 \end{pmatrix} \text{ or}$$

$$M_{standard} = \begin{pmatrix} x_1 & x_2 & x_3 \\ y_1 & y_2 & y_3 \\ z_1 & z_2 & z_3 \end{pmatrix} \begin{pmatrix} S_1 & 0 & 0 \\ 0 & S_2 & 0 \\ 0 & 0 & S_3 \end{pmatrix}; \text{ and}$$

$$\begin{pmatrix} S_1 \\ S_2 \\ S_3 \end{pmatrix} = \begin{pmatrix} x_1 & x_2 & x_3 \\ y_1 & y_2 & y_3 \\ z_1 & z_2 & z_3 \end{pmatrix}^{-1} \begin{pmatrix} \frac{x_w}{y_w} \\ 1 \\ \frac{z_w}{y_w} \end{pmatrix};$$

wherein
in a condition of determining $N_{Panel}$, $x_1$, $y_1$ and $z_1$ are XYZ color space chromatic coordinates of a color presented by a pixel when driven by a first value that has not been corrected, $X_2$, $y_2$ and $z_2$ are XYZ color space chromatic coordinates of a color presented by the pixel when driven by a second value that has not been corrected, $x_3$, $y_3$ and $z_3$ are XYZ color space chromatic coordinates of a color presented by the pixel when driven by a third value that has not been corrected, and $x_w$, $y_w$ and $z_w$ are XYZ color space chromatic coordinates of a color presented by the pixel when driven by a seventh value that has not been corrected;
in a condition of determining $M_{standard}$, $>x_1$, $y_1$ and $z_1$ are XYZ color space chromatic coordinates corresponding to the first value in a high-definition digital video standard, $x_2$, $y_2$ and $z_2$ are XYZ color space chromatic coordinates corresponding to the second value in the high-definition digital video standard, $x_3$, $y_3$ and $z_3$ are XYZ color space chromatic coordinates corresponding to the third value in the high-definition digital video standard, and $x_w$, $y_w$ and $z_w$ are XYZ color space chromatic coordinates corresponding to the seventh value in the high-definition digital video standard;

the first value, the second value, the third value and the seventh value each include a first color sub-pixel value, a second color sub-pixel value and a third color sub-pixel value;

a first color sub-pixel value of the first value is a maximum value, a second color sub-pixel value of the first value is equal to 0, and a third color sub-pixel value of the first value is equal to 0;

a first color sub-pixel value of the second value is equal to 0, a second color sub-pixel value of the second value is the maximum value, and a third color sub-pixel value of the second value is equal to 0;

a first color sub-pixel value of the third value is equal to 0, a second color sub-pixel value of the third value is equal to 0, and a third color sub-pixel value of the third value is the maximum value; and a first color sub-pixel value, a second color sub-pixel value and a third color sub-pixel value of the seventh value are all equal and each are the maximum value.

4. The video processing method according to claim 2, wherein
the plurality of value intervals include at least two of following eight value intervals:
a first value interval in which a first color sub-pixel value is greater than 0, a second color sub-pixel value is equal to 0, and a third color sub-pixel value is equal to 0;
a second value interval in which the first color sub-pixel value is equal to 0, the second color sub-pixel value is greater than 0, and the third color sub-pixel value is equal to 0;
a third value interval in which the first color sub-pixel value is equal to 0, the second color sub-pixel value is equal to 0, and the third color sub-pixel value is greater than 0;
a fourth value interval in which the first color sub-pixel value and the second color sub-pixel value are equal and are greater than 0, and the third color sub-pixel value is equal to 0;
a fifth value interval in which the first color sub-pixel value is equal to 0, and the second color sub-pixel value and the third color sub-pixel value are equal and are greater than 0;
a sixth value interval in which the first color sub-pixel value and the third color sub-pixel value are equal and are greater than 0, and the second color sub-pixel value is equal to 0;
a seventh value interval in which the first color sub-pixel value, the second color sub-pixel value and the third color sub-pixel value are all equal and are all greater than 0; and
an eighth value interval in which the first color sub-pixel value, the second color sub-pixel value and the third color sub-pixel value are not equal and are all greater than 0.

5. The video processing method according to claim 4, wherein each set of correction data in sets of correction data corresponding to the at least two color zones is obtained through a reference matrix, and a set of correction data corresponding to the eighth value interval is the reference matrix.

6. The video processing method according to claim 4, wherein each value interval of the first value interval to the seventh value interval includes a representative value, and compared to when the pixel value of the pixel is a value other than the representative value in the value interval, in a case where the pixel value of the pixel is the representative value in the value interval, chromatic coordinates xy of a color presented by the pixel are closer to chromatic coordinates xy corresponding to the representative value in a high-definition digital video standard.

7. The video processing method according to claim 4, wherein each value interval of the first value interval to the seventh value interval includes a representative value, and chromatic coordinates xy of a color presented by the pixel in a case where the pixel value of the pixel is the representative value in the value interval are approximately equal to chromatic coordinates xy corresponding to the representative value in a high-definition digital video standard.

8. The video processing method according to claim 6, wherein representative values of the first value interval to the seventh value interval are a first value, a second value, a third value, a fourth value, a fifth value, a sixth value and a seventh value, respectively, wherein
a first color sub-pixel value of the first value is a maximum value, a second color sub-pixel value of the first value is equal to 0, and a third color sub-pixel value of the first value is equal to 0;
a first color sub-pixel value of the second value is equal to 0, a second color sub-pixel value of the second value is the maximum value, and a third color sub-pixel value of the second value is equal to 0;
a first color sub-pixel value of the third value is equal to 0, a second color sub-pixel value of the third value is equal to 0, and a third color sub-pixel value of the third value is the maximum value;
a first color sub-pixel value and a second color sub-pixel value of the fourth value are equal and are the maximum value each, and a third color sub-pixel value of the fourth value is equal to 0;
a first color sub-pixel value of the fifth value is equal to 0, and a second color sub-pixel value and a third color sub-pixel value of the fifth value are equal and are the maximum value each;
a first color sub-pixel value and a third color sub-pixel value of the sixth value are equal and are the maximum value each, and a second color sub-pixel value of the sixth value is equal to 0; and
a first color sub-pixel value, a second color sub-pixel value and a third color sub-pixel value of the seventh value are all equal and are the maximum value each.

9. The video processing method according to claim 1, wherein obtaining the video signal includes:
receiving a first video signal, the first video signal including first pixel values of a plurality of pixels;
preprocessing the first video signal to obtain a second video signal, including converting the first video signal into the second video signal having a first preset video format, wherein the second video signal includes second pixel values of the plurality of pixels; and
obtaining the video signal based on the second video signal.

10. The video processing method according to claim 9, wherein the first video signal includes a plurality of video sub-signals;

converting the first video signal into the second video signal having the first preset video format includes:

performing pixel rearrangement on the plurality of first pixel values in the plurality of video sub-signals in the first video signal, so as to obtain a third video signal including at least one image matrix, wherein each image matrix of the at least one image matrix includes first pixel values, and a number of rows of the image matrix and a number of columns of the image matrix are respectively equal to a row resolution and a column resolution of a first resolution included in the first preset video format; and converting the third video signal into the second video signal having the first preset video format.

11. The video processing method according to claim 10, wherein the plurality of video sub-signals include four video sub-signals; each video sub-signal includes four video division signals, each video division signal includes a plurality of data units, and each data unit includes a first pixel value of at least one pixel in the plurality of pixels;

performing the pixel rearrangement on the plurality of first pixel values in the plurality of video sub-signals in the first video signal, so as to obtain the third video signal including the at least one image matrix, includes:

for each video sub-signal, arranging four data units in a same ordinal position in the four video division signals into a first matrix, the first matrix including two rows and two columns of data units; and arranging first matrices in a same ordinal position in the four video sub-signals into a second matrix, the second matrix including two rows and two columns of first matrices, so as to obtain the image matrix including a plurality of second matrices; or for each video sub-signal, arranging the four data units in the same ordinal position in the four video division signals into the first matrix, and arranging first matrices in the video sub-signal into a third matrix, the first matrix including the two rows and two columns of data units; and arranging four third matrices corresponding to the four video sub-signals into the image matrix, the image matrix including two rows and two columns of third matrices.

12. The video processing method according to claim 10, wherein the plurality of video sub-signals include four video sub-signals; each video sub-signal includes four video division signals, each video division signal includes a plurality of data units, and each data unit includes a first pixel value of at least one pixel in the plurality of pixels; performing the pixel rearrangement on the plurality of first pixel values in the plurality of video sub-signals in the first video signal, so as to obtain the third video signal including the at least one image matrix, includes:

arranging first pixel values in each video sub-signal into a fourth matrix; and arranging four fourth matrices corresponding to the four video sub-signals into the image matrix, the image matrix including two rows and two columns of fourth matrices.

13. The video processing method according to claim 9, wherein the first preset video format includes at least one of a color mode, a color depth and a frame rate, or a first resolution;

in a case where a resolution of the first video signal is less than the first resolution, converting the first video signal into the second video signal having the first preset video format includes:

converting the first video signal into a fourth video signal having a second preset video format, wherein the second preset video format includes a second resolution, and other parameters of the second preset video format except for the second resolution are same as parameters of the first preset video format except for the first resolution; and adjusting a resolution of the fourth video signal to obtain the second video signal having the first preset video format.

14. The video processing method according to claim 1, further comprising:

receiving an on-screen display (OSD) trigger command; and in response to the OSD trigger command, superimposing OSD information onto the video signal that has undergone the chromatic calibration; wherein outputting the video signal that has undergone the chromatic calibration includes: outputting the video signal superimposed with the OSD information.

15. A video processing device, comprising a processor and a memory, wherein the memory has stored thereon computer program instructions, and the processor is configured to execute the computer program instructions, so as to cause the video processing device to implement the video processing method according to claim 1.

16. A video processing device, wherein the video processing device is a chip, and the chip is configured to perform image processing in accordance with the video processing method according to claim 1.

17. A display device, comprising:

a display module; and the video processing device according to claim 15, wherein the display module is used for displaying an image that has been processed by the video processing device.

18. A non-transitory computer-readable storage medium, wherein the non-transitory computer-readable storage medium has stored thereon computer program instructions, and the computer program instructions are configured to, when run on a display device, cause the display device to execute the video processing method according to claim 1.

19. A video processing method, comprising:

obtaining a video signal, a color gamut range of the video signal including at least two color zones, each of the at least two color zones corresponding to a set of correction data;

performing chromatic calibration on the video signal, including correcting image data of the video signal in a color zone of the at least two color zones using a set of correction data corresponding to the color zone; and outputting the video signal that has undergone the chromatic calibration;

wherein each set of correction data in sets of correction data corresponding to the at least two color zones is obtained through a reference matrix; and the reference matrix A satisfies following conditions:

$$A = N_{Panel}^{-1} M_{standard}, \text{ where}$$

$$N_{Panel} = \begin{pmatrix} x_1 & x_2 & x_3 \\ y_1 & y_2 & y_3 \\ z_1 & z_2 & z_3 \end{pmatrix} \begin{pmatrix} S_1 & 0 & 0 \\ 0 & S_2 & 0 \\ 0 & 0 & S_3 \end{pmatrix} \text{ or}$$

-continued $$M_{standard} = \begin{pmatrix} x_1 & x_2 & x_3 \\ y_1 & y_2 & y_3 \\ z_1 & z_2 & z_3 \end{pmatrix} \begin{pmatrix} S_1 & 0 & 0 \\ 0 & S_2 & 0 \\ 0 & 0 & S_3 \end{pmatrix} ; \text{and}$$

$$\begin{pmatrix} S_1 \\ S_2 \\ S_3 \end{pmatrix} = \begin{pmatrix} x_1 & x_2 & x_3 \\ y_1 & y_2 & y_3 \\ z_1 & z_2 & z_3 \end{pmatrix}^{-1} \begin{pmatrix} \frac{x_w}{y_w} \\ 1 \\ \frac{z_w}{y_w} \end{pmatrix} ;$$

wherein
in a condition of determining $N_{Panel}$, $x_1$, $y_1$ and $z_1$ are XYZ color space chromatic coordinates of a color presented by a pixel when driven by a first value that has not been corrected, $X_2$, $y_2$ and $z_2$ are XYZ color space chromatic coordinates of a color presented by the pixel when driven by a second value that has not been corrected, $x_3$, $y_3$ and $z_3$ are XYZ color space chromatic coordinates of a color presented by the pixel when driven by a third value that has not been corrected, and $x_w$, $y_w$ and $z_w$ are XYZ color space chromatic coordinates of a color presented by the pixel when driven by a seventh value that has not been corrected;

in a condition of determining M standard, $x_1$, $y_1$ and $z_1$ are XYZ color space chromatic coordinates corresponding to the first value in a high-definition digital video standard, $x_2$, $y_2$ and $z_2$ are XYZ color space chromatic coordinates corresponding to the second value in the high-definition digital video standard, $x_3$, $y_3$ and $z_3$ are XYZ color space chromatic coordinates corresponding to the third value in the high-definition digital video standard, and $x_w$, $y_w$ and $z_w$ are XYZ color space chromatic coordinates corresponding to the seventh value in the high-definition digital video standard;

the first value, the second value, the third value and the seventh value each include a first color sub-pixel value, a second color sub-pixel value and a third color sub-pixel value;

a first color sub-pixel value of the first value is a maximum value, a second color sub-pixel value of the first value is equal to 0, and a third color sub-pixel value of the first value is equal to 0;

a first color sub-pixel value of the second value is equal to 0, a second color sub-pixel value of the second value is the maximum value, and a third color sub-pixel value of the second value is equal to 0;

a first color sub-pixel value of the third value is equal to 0, a second color sub-pixel value of the third value is equal to 0, and a third color sub-pixel value of the third value is the maximum value; and a first color sub-pixel value, a second color sub-pixel value and a third color sub-pixel value of the seventh value are all equal and each are the maximum value.

20. A video processing device, comprising a processor and a memory, wherein the memory has stored thereon computer program instructions, and the processor is configured to execute the computer program instructions, so as to cause the video processing device to implement the video processing method according to claim 19.

\* \* \* \* \*